(12) United States Patent
Bazarsky et al.

(10) Patent No.: US 11,520,521 B2
(45) Date of Patent: Dec. 6, 2022

(54) STORAGE CONTROLLER HAVING DATA AUGMENTATION COMPONENTS FOR USE WITH NON-VOLATILE MEMORY DIE

(71) Applicant: Western Digital Technologies, Inc., San Jose, CA (US)

(72) Inventors: Alexander Bazarsky, Holon (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/718,148

(22) Filed: Dec. 17, 2019

(65) Prior Publication Data

US 2020/0401344 A1 Dec. 24, 2020

Related U.S. Application Data

(63) Continuation-in-part of application No. 16/447,619, filed on Jun. 20, 2019.

(51) Int. Cl.
*G06F 3/06* (2006.01)
*G06F 11/07* (2006.01)
(Continued)

(52) U.S. Cl.
CPC .......... *G06F 3/0659* (2013.01); *G06F 3/0604* (2013.01); *G06F 3/0688* (2013.01);
(Continued)

(58) Field of Classification Search
CPC ....... G06K 9/6257; G06T 3/0006; G06T 3/60; G06N 20/00; G06F 11/0727; G11C 16/26
See application file for complete search history.

(56) References Cited

U.S. PATENT DOCUMENTS 6,545,907 B1 4/2003 Lowrey et al.
7,075,841 B2 7/2006 Resta et al.
(Continued)

FOREIGN PATENT DOCUMENTS

CN 106485317 A 3/2017
CN 107301455 A 10/2017
(Continued)

OTHER PUBLICATIONS

Chi et al., "PRIME: A Novel Processing-in-memory Architecture for Neural Network Computation in ReRAM-based Main Memory," 2016 ACM SIGARCH Computer Architecture News Jun. 18, 2016 (vol. 44, No. 3, pp. 27-39). IEEE Press, <https://seal.ece.ucsb.edu/sites/seal.ece.ucsb.edu/files/publications/prime_isca_2016.pdf>.
(Continued)

*Primary Examiner* — John W Lee
(74) *Attorney, Agent, or Firm* — Loza & Loza, LLP; Gabriel Fitch

(57) ABSTRACT

Methods and apparatus are disclosed for implementing data augmentation within a storage controller of a data storage device based on machine learning data read from a non-volatile memory (NVM) array of a memory die. Some particular aspects relate to configuring the storage controller to generate augmented versions of training images for use in training a Deep Learning Accelerator of an image recognition system by rotating, translating, skewing, cropping, etc., a set of initial training images obtained from a host device and stored in the NVM array. Other aspects relate to controlling components of the memory die to generate noise-augmented images by, for example, storing and then reading training images from worn regions of the NVM array to inject noise into the images. Data augmentation based on data read from multiple memory dies is also (Continued)

described, such as image data spread across multiple NVM arrays or multiple memory dies.

18 Claims, 22 Drawing Sheets

(51) Int. Cl.

| | | |
|---|---|---|
| G06F 11/10 | (2006.01) | |
| G06N 20/00 | (2019.01) | |
| G06T 3/20 | (2006.01) | |
| G06T 3/60 | (2006.01) | |
| G06T 5/00 | (2006.01) | |
| G06N 3/063 | (2006.01) | |
| G06N 3/08 | (2006.01) | |
| G06T 1/60 | (2006.01) | |

(52) U.S. Cl.
CPC ........ *G06F 11/076* (2013.01); *G06F 11/1044* (2013.01); *G06N 20/00* (2019.01); *G06T 3/20* (2013.01); *G06T 3/608* (2013.01); *G06T 5/002* (2013.01); *G06T 2207/10004* (2013.01); *G06T 2207/20172* (2013.01)

(56) References Cited

U.S. PATENT DOCUMENTS

| | | | |
|---|---|---|---|
| 7,274,586 | B2 | 9/2007 | Choi et al. |
| 7,983,069 | B2 | 7/2011 | Hsu et al. |
| 7,990,642 | B2 | 8/2011 | Lee et al. |
| 8,199,566 | B1 | 6/2012 | Fackenthal et al. |
| 8,725,935 | B2 | 5/2014 | Huang et al. |
| 8,793,554 | B2 | 7/2014 | Billing et al. |
| 9,530,491 | B1 | 12/2016 | Uttarwar et al. |
| 9,646,243 | B1 | 5/2017 | Gokmen |
| 9,767,565 | B2 | 9/2017 | Estrada et al. |
| 9,880,760 | B2 | 1/2018 | Inbar et al. |
| 10,176,092 | B2 | 1/2019 | Alcantara et al. |
| 2010/0027329 | A1 | 2/2010 | Lee et al. |
| 2012/0311262 | A1 | 12/2012 | Franceschini et al. |
| 2013/0013860 | A1 | 1/2013 | Franceschini et al. |
| 2016/0026912 | A1 | 1/2016 | Falcon et al. |
| 2016/0064409 | A1 | 3/2016 | Yaegashi |
| 2016/0085464 | A1 | 3/2016 | Tuers et al. |
| 2016/0092129 | A1 | 3/2016 | Agarwal et al. |
| 2016/0345009 | A1* | 11/2016 | Zhong .................. H04N 19/44 |
| 2017/0068451 | A1 | 3/2017 | Kenan et al. |
| 2017/0200078 | A1 | 7/2017 | Bichler |
| 2017/0270403 | A1 | 9/2017 | Zhang |
| 2017/0337466 | A1 | 11/2017 | Bayat et al. |
| 2018/0052766 | A1 | 2/2018 | Mehra et al. |
| 2018/0075338 | A1 | 3/2018 | Gokmen |
| 2018/0075344 | A1 | 3/2018 | Ma et al. |
| 2018/0157934 | A1* | 6/2018 | Hu ....................... G06K 9/6262 |
| 2018/0232508 | A1 | 8/2018 | Kursun |
| 2018/0330238 | A1 | 11/2018 | Luciw et al. |
| 2019/0019564 | A1 | 1/2019 | Li et al. |
| 2019/0057302 | A1* | 2/2019 | Cho ...................... G06N 3/0454 |
| 2019/0129834 | A1* | 5/2019 | Purkayastha ....... G06F 12/0246 |
| 2019/0147320 | A1 | 5/2019 | Mattyus et al. |
| 2019/0156202 | A1* | 5/2019 | Falk ........................ G06N 3/08 |
| 2019/0189236 | A1* | 6/2019 | Poliakov ................ G11C 29/38 |
| 2019/0243787 | A1 | 8/2019 | Mittal et al. |
| 2019/0258920 | A1 | 8/2019 | Lie et al. |
| 2020/0004674 | A1* | 1/2020 | Williams ............... G06N 20/00 |
| 2020/0311523 | A1* | 10/2020 | Hoang ................ G06F 9/30029 |
| 2020/0388071 | A1 | 12/2020 | Grabner et al. |
| 2020/0401344 | A1 | 12/2020 | Bazarsky et al. |

FOREIGN PATENT DOCUMENTS

| | | |
|---|---|---|
| CN | 108985344 A | 12/2018 |
| KR | 20180028966 A | 3/2018 |
| KR | 20180116094 A | 10/2018 |

OTHER PUBLICATIONS

Choe et al, "Near-Data Processing for Machine Learning," 2017, International Conference on Learning Representations. 12 pages. <https://openreview.net/pdf?id=H1_EDpogx>.
Sullivan, John, "Merging Memory and Computation, Programmable Chip Speeds AI, Slashes Power Use," Nov. 15, 2018, 5 pages <https://m.techxplore.com/news/2018-11-merging-memory-programmable-chip-ai.html>.
Jia et al, "A Microprocessor Implemented in 65nm CMOS with Configurable and Bit-scalable Accelerator for Programmable In-memory Computing," Nov. 9, 2018, 10 pages <https://arxiv.org/pdf/1811.04047.pdf>.
Valavi et al, "A Mixed-Signal Binarized Convolutional-Neural-Network Accelerator Integrating Dense Weight Storage and Multiplication for Reduced Data Movement," VLSI Symp. on Circuits (VLSIC), Jun. 2018. 2 pages. <http://www.princeton.edu/~nverma/VermaLabSite/Publications/2018/ValaviRamadgeNestlerVerma_VLSI18.pdf>.
Nielsen, Michael, "Neural Networks and Deep Learning, Chapter 2: How the backpropagation algorithm works," 2015, 27 pages <http://neuralnetworksanddeeplearning.com/chap2.html>.
Poznanski et al., "CNN-N-Gram for Handwriting Word Recognition," Dec. 12, 2016; pp. 2305-2314. <https://www.cs.tau.ac.il/~wolf/papers/CNNNGram.pdf>.
Inoue, Hiroshi, "Data Augmentation by Pairing Samples for Images Classification," Apr. 11, 2018. 8 pages. <https://arxiv.org/pdf/1801.02929.pdf>.
Mikolajczyk et al., "Data augmentation for improving deep learning in image classification problem," 2018 IEEE 978-1-5386-6143-7/18. 6 pages. <https://ieeexplore.ieee.org/document/8388338>.
Wang et al., "The Effectiveness of Data Augmentation in Image Classification using Deep Learning," Dec. 13, 2017. 8 pages. <http://cs231n.stanford.edu/reports/2017/pdfs/300.pdf>.
"NGD Systems: Introduction to Computational Storage," NGD Systems, Inc, Jun. 2018. 5 pages. <www.ngdsystems.com>.
Hadidi et al., "Demystifying the Characteristics of 3D-Stacked Memories: A Case Study for Hybrid Memory Cube", Oct. 3, 2017 IEEE. 978-1-5386-1233-017. 10 pages. <https://arxiv.org/pdf/1706.02725>.
Park et al., "A hybrid flash translation layer design for SLC-MLC flash memory based multibank solid state disk", Microprocessors and Microsystems vol. 35, Issue 1, Feb. 2011, pp. 48-59 <https://www.sciencedirect.com/science/article/abs/pii/S0141933110000475>.
International Search Report and Written Opinion for International Application No. PCT/US19/68980, dated Mar. 23, 2020, 9 pages.
International Search Report and Written Opinion for International Application No. PCT/US2019/050105, dated Nov. 3, 2020, 13 pages.
Huang et al., "LTNN: An Energy-efficient Machine Learning Accelerator on 3D CMOS-RRAM for Layer-wise Tensorized Neural Network", 2017 30th IEEE International System-on-Chip Conference (SOCC); Sep. 5-8, 2017; 6 pages <https://ieeexplore.ieee.org/document/8226058>.

\* cited by examiner

300 — *Data Augmentation Operations performed by NVM Components*

302

Input and store an initial set of labeled input images for use with image recognition training (or other forms of deep learning or machine learning) within the NAND NVM array of a die of a solid state device

304

Read one or more of the labeled images from the NAND NVM array

306

Generate a set of altered versions of the labeled images by, e.g., rotating, translating, skewing, cropping, flipping, and/or adding noise to the labeled images read from the NAND NVM array to provide an augmented image set (where flipping of a parsed image is performed by reading bits in reverse order and where noise is added, e.g., by selectively omitting bits, rows or columns)

308

Perform Machine Learning, such as DLA learning, using the augmented image set to, for example, train an image recognition system to recognize images within the augmented image set, and output or store a set of trained image recognition parameters

*FIG. 3*

1700 — *Data Augmentation Operations performed by Controller*

1702
Store an initial set of labeled input images received from a host device for use with image recognition training (or other forms of deep learning or machine learning) in the NAND NVM array of the solid state device

1704
Read one or more of the labeled images from the NAND NVM array into a RAM coupled to the controller

1706
Generate a set of altered versions of the labeled images by, e.g., rotating, translating, skewing, cropping, flipping, and/or adding noise to the labeled images read from the NAND NVM array to provide an augmented image set (where flipping of a parsed image is performed by reading bits in reverse order and where noise is added, e.g., by selectively omitting bits, rows or columns)

1708
Perform Machine Learning, such as DLA learning, within the controller using the augmented image set to, for example, train an image recognition system to recognize images within the augmented image set, and then output to the host a set of trained image recognition parameters (or store in the NAND NVM array)

*FIG. 17*

STORAGE CONTROLLER HAVING DATA AUGMENTATION COMPONENTS FOR USE WITH NON-VOLATILE MEMORY DIE

CROSS-REFERENCE TO RELATED APPLICATIONS

This application is a continuation-in-part of U.S. patent application Ser. No. 16/447,619, filed Jun. 20, 2019, (WDA-4383-US), entitled "NON-VOLATILE MEMORY DIE WITH ON-CHIP DATA AUGMENTATION COMPONENTS FOR USE WITH MACHINE LEARNING," the entire content of which is incorporated herein by reference.

FIELD

The disclosure relates, in some aspects, to data storage controllers for use with non-volatile memory (NVM) dies. More specifically, but not exclusively, the disclosure relates to methods and apparatus for implementing data augmentation within a data storage controller.

INTRODUCTION

Machine learning generally relates to the use of artificial intelligence to perform tasks without explicit instructions and instead relying on learned patterns and applying such learning for inference. Deep learning (which also may be referred to as deep structured learning or hierarchical learning) relates to machine learning methods based on learning data representations or architectures, such as deep neural networks (DNNs), rather than to task-specific procedures or algorithms. Deep learning is applied to such fields as speech recognition, computer vision, and self-driving vehicles. Deep learning may be accomplished by, or facilitated by, deep learning accelerators (DLAs), e.g., microprocessor devices designed to accelerate the generation of useful neural networks to implement deep learning.

A DLA or other machine learning system may need to be trained using initial training data, such as an initial set of images that have been tagged or labeled for use in training an image recognition system. Data augmentation includes procedures for expanding an initial set of images in a realistic but randomized manner to increase the variety of data for use during training. For example, a small set of input images may be altered slightly (by, e.g., rotating or skewing the images) to create a larger set of images (i.e. an augmented image set) for use in training the system. That is, data augmentation allows re-using tagged or labeled data in multiple training instances in order to increase the size of the training data set.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes: a memory die with non-volatile memory (NVM) elements; and a storage controller configured to obtain machine learning data from the NVM elements of the memory die and augment the machine learning data.

Another embodiment of the disclosure provides a method for use by a storage controller of a data storage device, the method including: obtaining machine learning data from an NVM array of a memory die; and generating, at the storage controller, augmented machine learning data from the machine learning data.

Yet another embodiment of the disclosure provides an apparatus for use with a data storage device where the apparatus includes: means within a storage controller of the data storage device for obtaining machine learning data from a an NVM array of a memory die of the data storage device; and means within the storage controller of the data storage device for augmenting the machine learning data obtained from the NVM array with augmented machine learning data.

BRIEF DESCRIPTION OF THE DRAWINGS

FIG. 3 illustrates a flow chart of an exemplary method according to aspects of the present disclosure for performing various types of on-chip data augmentation of image data.

FIG. 17 illustrates a flow chart of an exemplary method according to aspects of the present disclosure for performing various types of data augmentation of image data using a data storage controller.

DETAILED DESCRIPTION

Figure 1:
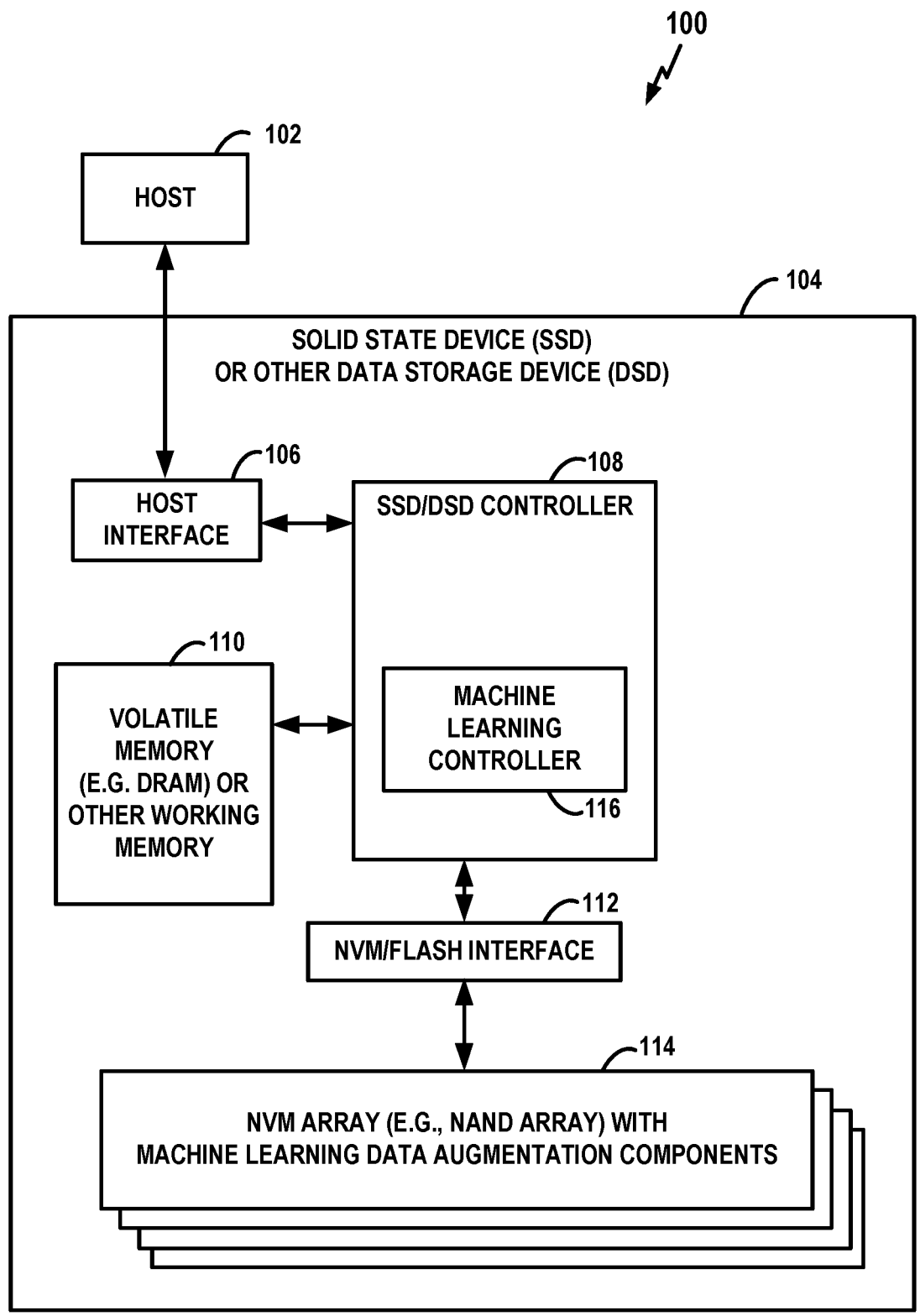
FIG. 1 is a schematic block diagram illustrating a data storage device in the form of an exemplary solid state device (SSD), or other data storage device (DSD), having one or more non-volatile memory (NVM) array dies, where the dies have on-chip data augmentation components.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to non-volatile memory (NVM) arrays, and to data storage devices or apparatus for controlling the NVM arrays, such as a controller of a data storage device (DSD), such as a solid state device (SSD), and in particular to solid-state memory storage devices such as those that use NAND flash memory (herein "NANDs"). (A NAND is a type of non-volatile storage technology that does not require power to retain data. It exploits negative-AND, i.e. NAND, logic.) For the sake of brevity, an SSD having one or more NAND dies will be used as a non-limiting example of a DSD below in the description of various embodiments. It is understood that at least some aspects described herein may be applicable to other forms of data storage devices as well. For example, at least some aspects described herein may be applicable to a data storage or memory device including phase-change memory (PCM) arrays, magneto-resistive random access memory (MRAM) arrays and resistive random access memory (ReRAM) arrays. In addition, the various embodiments may be used in various machine learning devices which may include some combination of processing elements and memory/data storage elements, including the NVM arrays constructed/configured in accordance with the described embodiments.

Overview

As noted above, machine learning may be accomplished by, or facilitated by, deep learning accelerators (DLAs), e.g., microprocessor devices designed to accelerate the generation of deep neural networks (DNNs) to implement machine learning. These neural networks may also be referred to as learning networks. A DLA may need to be trained using initial training data, such as an initial set of images for training an image recognition system having a DLA. Data augmentation is a process of modifying an initial set of images (in, e.g., a realistic but randomized manner) to increase the variety or variance of data for use during training. For example, a set of input images may be altered (by, e.g., rotating or skewing the images) to create a larger set of images (e.g. an augmented image set of slightly altered images) for use in training the system. Data augmentation may be defined more generally as a regularization technique for avoiding overfitting when training a machine learning system, such as a machine learning network or algorithm. Regularization is the process of adding information in order to solve an ill-posed problem or to prevent overfitting during machine learning. For example, regularization may make slight modifications to a learning model so the learning model generalizes more effectively from training data. Herein, the term data augmentation is defined as generating at least one modified version of data to avoid or reduce the risk of overfitting during training of a machine learning system using the data. The data may be, for example, a data vector, data array, data object or data representation of any number of dimensions, such as a 2-D data object containing one or more patterns. Examples of such data include images or audio segments or other types of numerical data, categorical data, time series data, or text.

Deep learning or machine learning may be implemented using processing components that are integrated with the memory components where the data to be processed is stored, i.e. using "near memory" computing, so as to reduce the need to transfer large quantities of data from one component to another. (The alternative, i.e. using standalone processing units such as graphics processing units (GPUs), central processing units (CPUs), etc., and stand-alone memory units such as dynamic random-access-memory (DRAM), can require transference of large quantities of data from one component to another.)

Herein, methods and apparatus are disclosed for implementing data augmentation for use with near memory machine learning systems such as DNNs employing DLAs where the data augmentation is performed within the die of an NVM using, for example, under-the-array data augmentation components or next-to-the-array components or is performed using components of an off-chip memory controller coupled to the die. That is, a near memory computing architecture is disclosed herein for data augmentation. The NVM die or dies may be part of a DSD such as a SSD.

Note that a DNN is an example of an artificial neural network that has multiple layers between input and output. A DNN operates to determine a mathematical computation or manipulation to convert the input into the output, which might be a linear or non-linear computation. For example, the DNN may work through its layers by calculating a probability of each output. Each mathematical manipulation may be considered a layer. Networks that have many layers are referred to as having "deep" layers, hence the term DNN. In one particular example, the DNN might be configured to identify a person within an input image by processing the bits of the input image to yield identify the particular person, i.e. the output of the DNN is a value that identifies the particular person. The DNN may need to be trained. The data augmentation procedures and apparatus described herein may be used to augment an initial set of training data, such as an initial set of labeled images (where labeled images are images containing known data, such as an image that has already been identified as corresponding to a particular type of object). In addition to configuring an NVM die for near memory data augmentation, the die may also be configured for near memory DNN processing by, for example, providing a DLA on the die as well as data augmentation circuits.

An advantage of at least some of the exemplary methods and apparatus described herein is that only the final result of a data augmented training procedure is transferred to the controller and host, thus avoiding the transference of large amounts of training data, such as augmented sets of training images that might include thousands of augmented images.

Note also that the data augmentation machine learning dies described herein may be different from GPUs in that a GPU typically transfers calculated data from its NVM to a working memory (such as a volatile memory, e.g., RAM/DRAM, or a non-volatile memory suitable for fast access), whereas the augmentations described in various examples herein are done by the dies. (For the purpose of simplicity of description, DRAM will be used as the primary and non-limiting example of a working memory in the illustration of various embodiments.) As noted, in some examples, the die includes extra-array logic for performing the augmentation, storing the results, and performing other machine learning operations, such as the actual training of a DLA based on the augmented data. Thus, in some aspects, a NVM architecture is disclosed that offloads data augmentation from host devices or other devices and instead performs the augmentation within the NVM die. Moreover, at least some of the methods and apparatus disclosed herein exploit die parallelism and inherent features of an NVM (such as inherent noise features). This can facilitate the implementation of machine learning edge computing application training on-chip. Data augmentation may also be performed by storage controller components using data obtained from NVM dies.

The data augmentation methods and apparatus described herein may be used in conjunction with on-chip DLA features and other features described in U.S. patent application Ser. No. 16/212,586 and in U.S. patent application Ser. No. 16/212,596, both entitled "NON-VOLATILE MEMORY DIE WITH DEEP LEARNING NEURAL NETWORK," and both filed on Dec. 6, 2018, both of which are assigned to the assignee of the present application and incorporated herein by reference in their entirety.

Exemplary Machine Learning Systems/Procedures with NVM-Based Data Augmentation

FIG. 1 is a block diagram of a system 100 including an exemplary SSD (or DSD) having an NVM with on-chip machine learning data augmentation components. The system 100 includes a host 102 and a SSD 104 or other DSD coupled to the host 102. The host 102 provides commands to the SSD 104 for transferring data between the host 102 and the SSD 104. For example, the host 102 may provide a write command to the SSD 104 for writing data to the SSD 104 or read command to the SSD 104 for reading data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, or a digital phone as merely a few examples. Additionally or alternatively, the host 102 may be a system or device having a need for neural network processing, such as speech recognition, computer vision, and self-driving vehicles. For example, the host 102 may be a component of a self-driving system of a vehicle.

The SSD 104 includes a host interface 106, an SSD/DSD controller 108, a volatile memory 110 (such as DRAM) or other working memory, an NVM interface 112 (which may be referred to as a flash interface), and an NVM array 114, such as one or more NAND dies configured with on-chip machine learning data augmentation components. The host interface 106 is coupled to the controller 108 and facilitates communication between the host 102 and the controller 108. The controller 108 is coupled to the memory 110 as well as to the NVM array 114 via the NVM interface 112. The host interface 106 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD 104. In other embodiments, the SSD 104 is remote from the host 102 or is contained in a remote computing system communicatively coupled with the host 102. For example, the host 102 may communicate with the SSD 104 through a wireless communication link.

Although, in the example illustrated in FIG. 1, SSD 104 includes a single channel between controller 108 and NVM die(s) 114 via interface 112, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 108 may be implemented in a single integrated circuit chip and may communicate with different layers of memory in the NVM die(s) 114 over one or more command channels.

The controller 108 controls operation of the SSD 104. In various aspects, the controller 108 receives commands from the host 102 through the host interface 106 and performs the commands to transfer data between the host 102 and the NVM array 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD 104. In some aspects, some or all of the functions described herein as being performed by the controller 108 may instead be performed by another element of the SSD 104. For example, the SSD 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any suitable memory, computing device, or system capable of storing data. For example, the memory 110 may be ordinary RAM, DRAM, double data rate (DDR) RAM (DRAM), static RAM (SRAM), synchronous dynamic RAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host 102 and the NVM array 114. For example, the memory 110 or a portion of the memory 110 may be a cache memory. The NVM array 114 receives data from the controller 108 via the NVM interface 112 and stores the data. The NVM array 114 may be any suitable type of non-volatile memory, such as a NAND-type flash memory or the like. In some embodiments, volatile memory 110 may be replaced by a non-volatile memory such as MRAM, PCM, ReRAM, etc. to serve as a working memory for the overall device.

In the example of FIG. 1, the controller 108 may include hardware, firmware, software, or any combinations thereof that provide a machine learning controller 116 for use with the NVM array 114 (where the machine learning controller, in some examples, may include at least some off-chip data augmentation components such as components that control data augmentation based on controlling off-chip error correction). Although FIG. 1 shows an example SSD and an SSD is generally used as an illustrative example in the description throughout, the various disclosed embodiments are not necessarily limited to an SSD application/implementation. As an example, the disclosed NVM die and associated processing components can be implemented as part of a package that includes other processing circuitry and/or components. For example, a processor may include, or otherwise be coupled with, embedded NVM and associated circuitry and/or components for machine learning that are described herein. The processor could, as one example, off-load certain machine learning tasks to the NVM and associated circuitry and/or components. As another example, the controller 108 may be a controller in another type of device and still include the machine learning controller 116 and perform some or all of the functions described herein.

Figure 2:
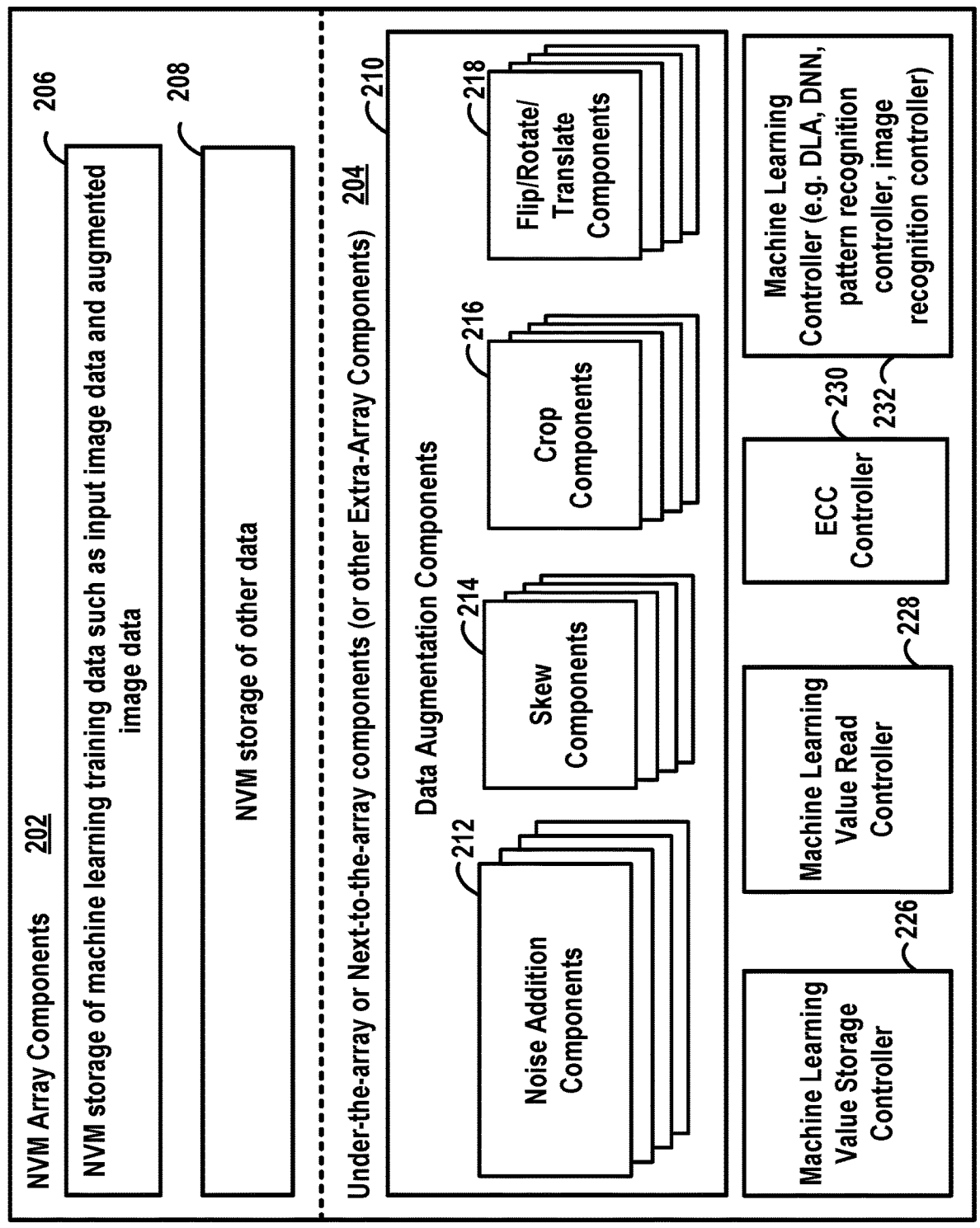
FIG. 2 illustrates an example of an NVM die having on-chip under-the-array or next-to-the-array components configured for data augmentation processing.

FIG. 2 illustrates a block diagram of an exemplary NVM die 200 that includes NVM storage array components 202 and under-the-array or next-to-the-array (or other extra-array) processing components 204. Not all circuit or memory components that might be used in a practical NVM die are illustrated in the figure, such as input and output components, voltage regulation components, clocks and timing components, etc. Rather only some components and circuits are shown, summarized as block or schematic diagrams. The exemplary NVM array components 202 include: NVM storage 206 for storing machine learning training data such as input image data and augmented image data; and NVM storage 208 configured for storing other data such as DNN synaptic weights, bias values, etc., or other types of user data or system data.

The NVM extra-array processing components 204 include data augmentation components 210 configured to perform or control data augmentation operations. In the example of FIG. 2, the exemplary data augmentation components 210 include: one or more noise addition components 212 configured to generate augmented machine learning data by adding noise to initial machine learning data, such as by adding uncorrelated noise to each of an initial set of labeled training images; one or more skew components 214 configured to generate augmented machine learning data by skewing initial machine learning data, such as by skewing each of an initial set of labeled training images in a different manner; one or more crop components 216 configured to generate augmented machine learning data by cropping initial machine learning data, such as by cropping each of an initial set of labeled training images in a different manner; one or more flip/rotate/translate components 218 configured to generate augmented machine learning data by flipping, rotating and/or translating initial machine learning data, such as by flipping, rotating and/or translating each of an initial set of labeled training images in a different manner.

Multiple instances of each augmentation component (212, 214, 216, and 218) are shown since, in some examples, a plurality of such devices may operate in parallel. For example, N noise addition components 212 may be provided to concurrently process N different input training images to generate a set of augmented images from each of the N different input training images. In other examples, only a single instance of each component may be provided. In still other examples, only one or a few of the illustrated components are provided such as only the noise addition components 212 or only the skew components 214. In yet other examples, other augmentation components are additionally or alternatively provided, which serve to augment the initial data set in other manners. Note also that the exemplary components of FIG. 2 primarily relate to the augmentation of image data. For examples where the data is not image data but, for example, audio data, different augmentation components may be provided that are appropriate to the type of data.

The NVM extra-array processing components 204 of FIG. 2 also include various other components including: a machine learning value storage controller 226 configured to store machine learning data in the NVM storage 206; a machine learning value read controller 228 configured to read previously-stored machine learning data from the NVM storage 206; and an on-chip error correction code (ECC) controller 230 configured to control any on-chip ECC applied to data as it is read from the NVM array components 202 to address a bit error rate (BER). As will be explained, certain types of data augmentation can be performed by adjusting ECC or, in some cases, deactivating ECC so as to increase the BER to selectively add noise into images. That is, a data augmentation controller may be configured to generate augmented data by reducing an amount of error correction performed by the error correction components compared to an average amount of error correction that would otherwise be employed to read data not subject to data augmentation, and then reading stored data from the NVM elements with the reduced error correction. And so, in one example, if the device ordinarily examines three bytes of ECC data within 512 bytes of data, ECC may be reduced by examining only two bytes of the ECC data. Thus, if the die itself is equipped for performing ECC procedures, those procedures can be deactivated or modified to increase the noise in the data read from the NAND arrays to provide augmented image data. It is noted that, in many systems, ECC is instead performed by a device controller that is separate from the die (such as controller 108 of FIG. 1). In such implementations, the die itself does not control ECC and hence cannot directly adjust the ECC. In such systems, because the ECC is performed by the controller, all images read by the die may be "noisy" images suitable for use as augmented images in on-chip training. Also, note that the BER for an NVM block may vary as a function of underlying conditions and memory type and so read controller 228 may be programmed or configured to take such information into account when selecting a target location for storing data. For example, for data augmentation purposes, write parameters may be selected or modified to increase the BER so that any augmentation requirements are satisfied. This is in contrast to the conventional desire to reduce BER so that ECC decoding is easier. As will be explained below, one technique for modifying write parameters is to modify the location where image data is written so as to store the data in worn regions of the NVM array 202 to thereby increase storage errors, so as to inject noise into the stored/retrieved image data.

FIG. 2 also illustrates a machine learning controller 232, which may be, e.g., a DLA, DNN, pattern recognition controller, image recognition controller, etc., configured to perform some form of machine learning using augmented data. In some examples, the augmented data is stored in the NVM arrays 202 for later use. In other examples, augmented data is held in other memory within the die, such as within data latches (not shown in FIG. 2), for immediate use by training components, then erased or overwritten. That is, in some examples, the augmented data may be transient data that is saved only as long as it is needed to train a machine learning system (e.g. a DNN) and then discarded.

In the following, various exemplary data augmentation systems and procedures are described where data is stored in a NAND array and where the data augmentation is used to train image or pattern recognition systems. As already explained, other types of NVM arrays may be used and the data augmentation may be applied to other types of machine learning. Hence, the following descriptions provide illustrative and non-limiting examples.

Image Recognition Examples Employing NVM-Based Data Augmentation

FIG. 3 illustrates an exemplary method 300 for data augmentation for use with image recognition according to aspects of the present disclosure where any of the aforementioned forms of data augmentation may be applied (e.g. skewing, rotating, etc.). Beginning at block 302, input circuitry of an NVM die inputs an initial set of labeled (or tagged) input images for use with image recognition training (or for use with other forms of deep learning or machine learning) and stores the initial set of images within a NAND NVM array of the die. At 304, read circuitry of the NVM die reads one or more of the labeled images from the NAND NVM array. At 306, data augmentation circuitry of the NVM die generates a set of altered versions of the labeled images by, e.g., rotating, translating, skewing, cropping, flipping, and/or adding noise to the labeled images read from the NAND NVM array to provide an augmented image set. At 308, machine learning circuitry of the NVM die performs machine learning, such as DLA learning, using the augmented image set to, for example, train an image recognition system to recognize images within the augmented image set, and then output a set of trained parameters. In some examples, the parameters may include synaptic weights, bias values, etc., for use with a DNN configured for image recognition. The image recognition system itself may be configured, e.g., within the extra-array circuitry of the die or may be embodied elsewhere, such as within an SSD controller, a host system, or a remote server.

Insofar as flipping is concerned, when using a DLA, images often need to be stored in a parsed format (rather than a compressed format like JPEG). With parsed images, flipping of an image can be achieved by reversing the order of read pixels. Flipping on a different axis may be performed by the die if the size and parameters of the image are stored in the NAND memory (as would often be the case with an on-chip DLA) and hence the parameters are available to the die logic circuitry for use in flipping. Note also that noise can be added to an image by omitting every other bit of the image or every other row or column of the image, or by performing other relatively straight-forward adjustments to an image to generate a "noisy" version of the image.

Figure 4:
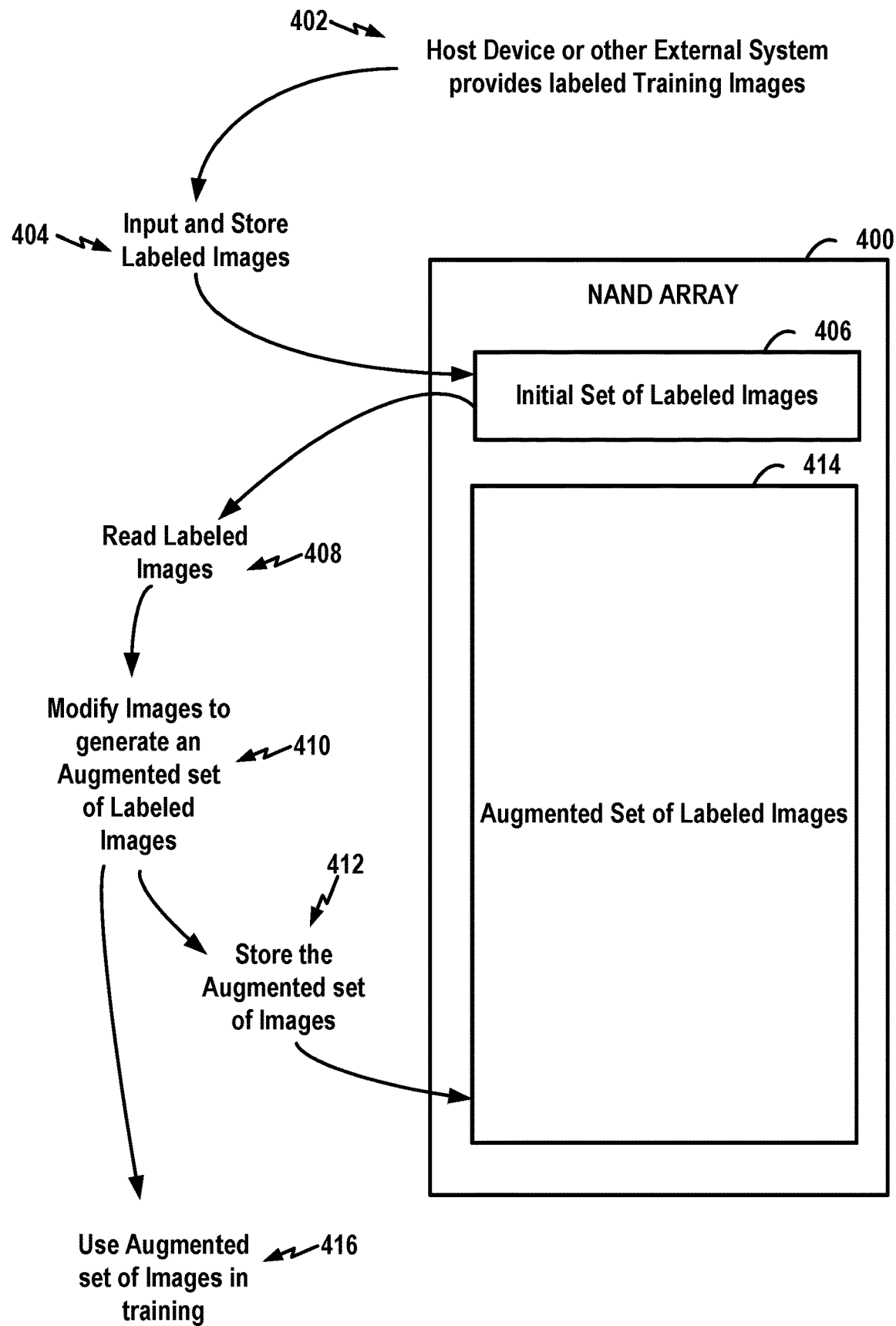
FIG. 4 illustrates a NAND array of an NVM die for storing image data and also schematically illustrating the various on-chip data augmentation procedures of FIG. 3.

FIG. 4 illustrates a NAND array 400 of an NVM die (such as the die of FIG. 2) for storing image data and various procedures that manipulate and process the data using the methods of FIG. 3. At 402, a host device or other external system provides labeled training images, such as labeled images of particular individuals to be identified by an image recognition system or particular types of objects or animals to be detected. At 404, circuitry of the NVM die inputs and stores the labeled images within a first portion or first region 406 of the NAND array 400. Later, when a data augmentation procedure is initiated, circuitry of the NAND die reads the labeled images at 408, modifies the images to generate an augmented set of labeled images at 410, and then stores the augmented set of images at 412 into a second region or second portion 414 of the NAND array 400 for subsequent use in training an image recognition system, such as for training the DLA of an on-chip image recognition system. Additionally or alternatively, at 416, the circuitry of the NAND die uses the augmented set of images (substantially) immediately to train an image recognition system, such as by directly applying the augmented set of images to an on-chip DLA.

Figure 5:
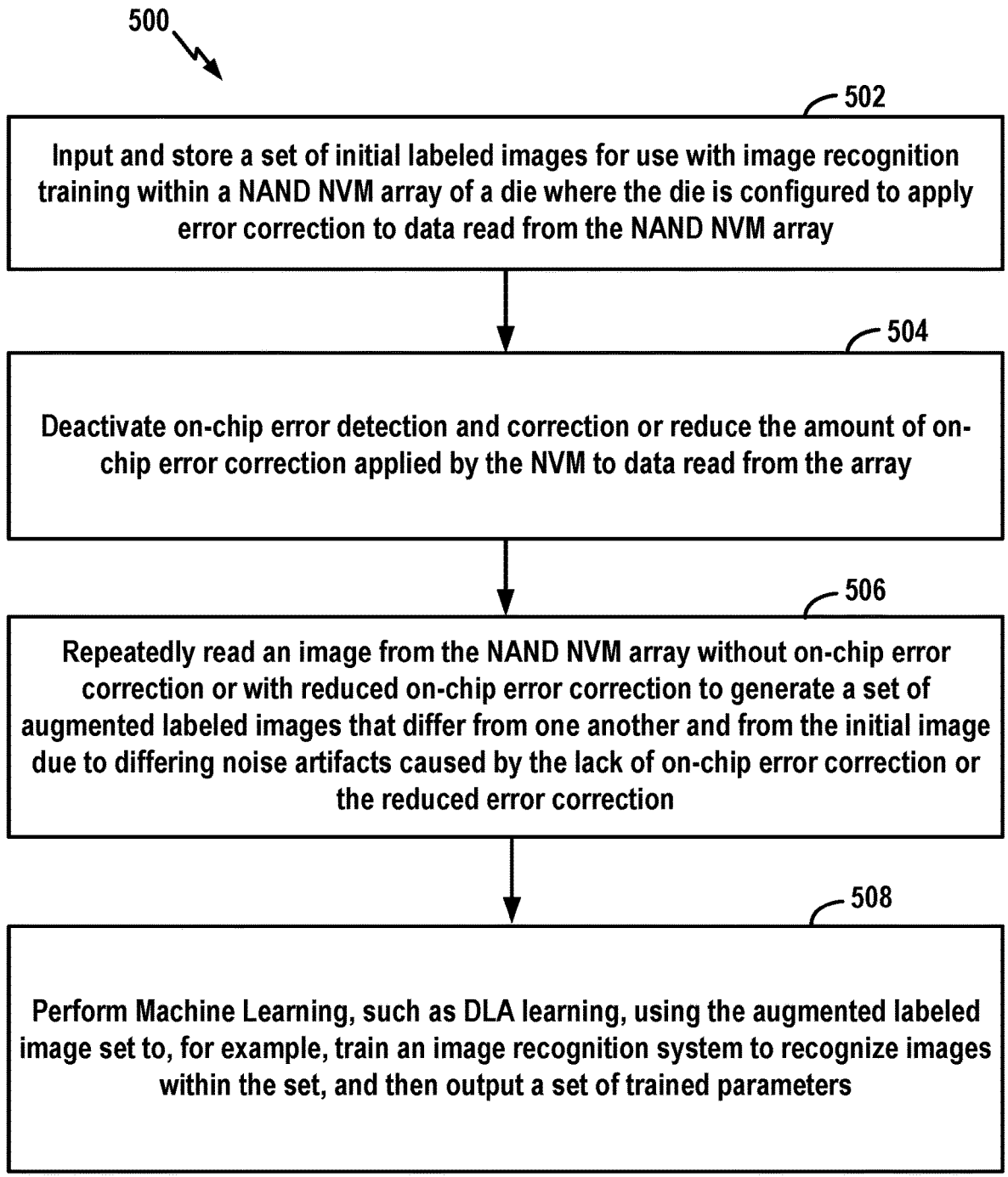
FIG. 5 illustrates a flow chart of an exemplary method according to aspects of the present disclosure for performing on-chip data augmentation of image data by deactivating or at least reducing the use of on-chip error correction procedures so as to obtain noisy images.

FIG. 5 illustrates an exemplary method 500 for data augmentation for use with image recognition according to aspects of the present disclosure where data augmentation is performed by deactivating or at least reducing the use of on-chip ECC (or other on-chip error correction systems or procedures). Note that, herein, deactivating ECC is one example of reducing the use of ECC. Beginning at block 502, input circuitry of the NVM die inputs an initial set of labeled input images for use with image recognition training (or other forms of deep learning or machine learning) and stores the initial set of labeled input images within a NAND NVM array of the die, where the die is configured to apply on-chip error correction to data read from the NAND NVM array. At 504, control circuitry of the NVM die deactivates on-chip error detection and correction procedures or otherwise reduces the amount (or effectiveness) of on-chip error correction applied by the NVM to data read from the array to selectively increase the effective BER. By deactivating ECC, data is read "as is," i.e. without ECC-based decoding. This reduces latency and saves power while also yielding noisy images for data augmentation. At 506, read circuitry of the NVM die repeatedly reads an image from the NAND NVM array without on-chip error correction or with reduced on-chip error correction to generate a set of augmented labeled images that differ from one another and from the initial image due to differing noise artifacts caused by the lack of on-chip error correction or the reduced error correction. In this manner, inherent noise associated with the natural BER of the die can be exploited to generate an augmented data set having uncorrelated noise artifacts (e.g. different noise vectors). At 508, machine learning circuitry of the NVM die performs machine learning, such as DLA learning, using the augmented labeled image set to, e.g., train an image recognition system to recognize images within the set, and then output a set of trained parameters. The image recognition system may be configured, e.g., within the extra-array circuitry of the die or may be embodied elsewhere, such as within an SSD controller, a host system, or a remote server.

Figure 6:
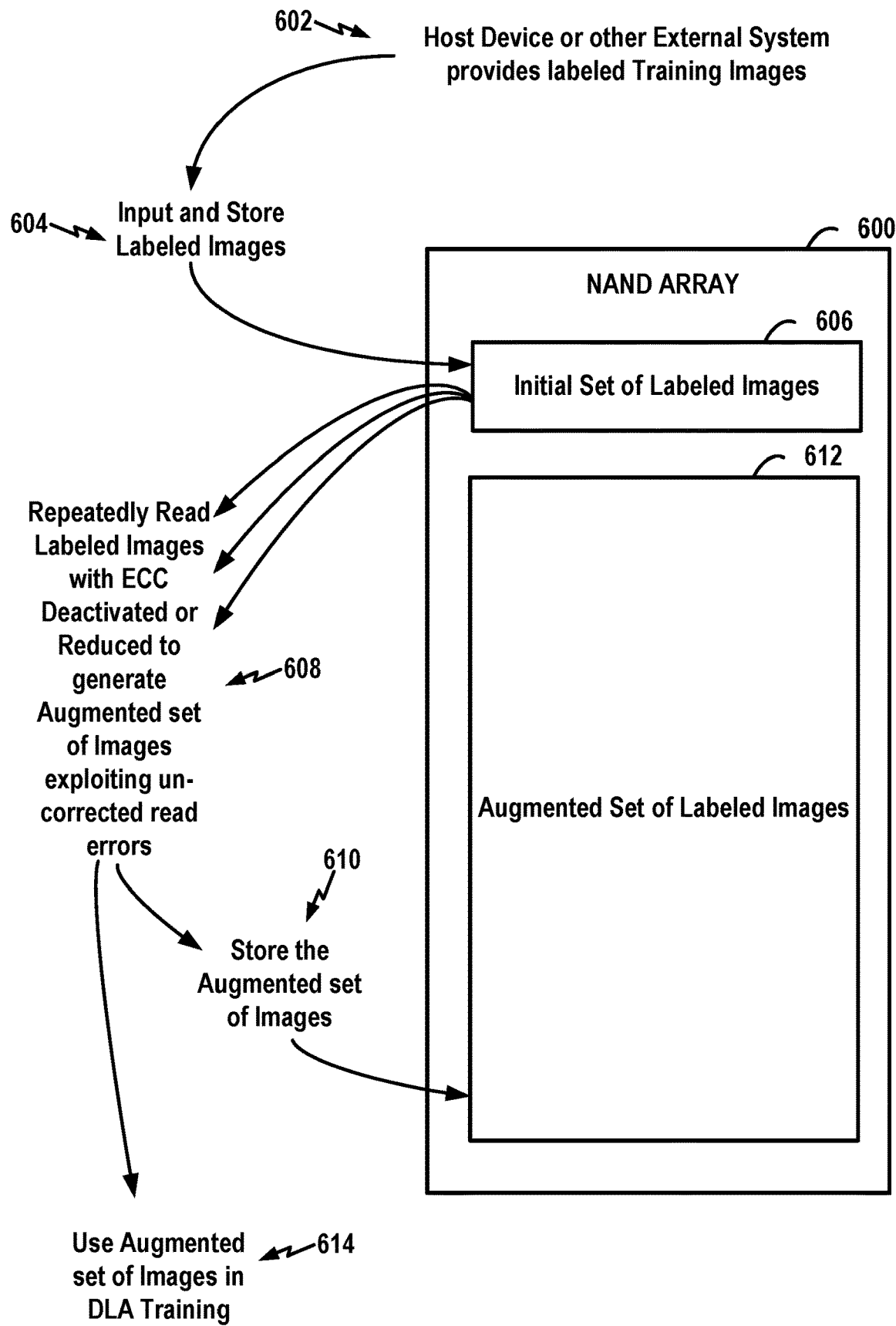
FIG. 6 illustrates a NAND array of an NVM die for storing image data and also schematically illustrating the error correction-based data augmentation procedures of FIG. 5.

FIG. 6 illustrates a NAND array 600 of an NVM die (such as the die of FIG. 2) for storing image data and various procedures that manipulate and process the data using the methods of FIG. 5. At 602, a host device or other external system provides labeled training images. At 604, circuitry of the NVM die inputs and stores the labeled images within a first portion or first region 606 of the NAND array 600. Later, when a data augmentation procedure is initiated, circuitry of the NAND die: repeatedly reads the labeled images at 608 with on-chip ECC deactivated or reduced so as to provide or retain noise within the read images and thus generate an augmented set of labeled images; and then stores the augmented set of images at 610 into a second region or second portion 612 of the NAND array 600 for subsequent use in training an image recognition system. Additionally or alternatively, at 614, the circuitry of the NAND die uses the augmented set of images (substantially) immediately to train an image recognition system.

In FIG. 6, multiple arrows are shown leading from the first array portion 606 to emphasize that individual images stored therein can be repeatedly read. Each separate read from the NAND array, performed either without on-chip ECC or with reduced on-chip ECC, will generally result in different noise artifacts in the read-out images, where the noise artifacts are uncorrelated within one another, thus providing noise-based data augmentation or noise-augmented data sets. The read operations may be performed repeatedly until a training system that uses the augmented data set is satisfied that a sufficient the number of samples of each particular image are collected, such as by comparing the number of sample against a suitable threshold value or by verifying that the system is sufficiently trained. In some examples, a read channel or NVM device controller that is separate from the NVM die (i.e. off-chip) may be configured to perform at least some of the procedures or operations of FIGS. 5 and 6, for example if ECC is performed by a device or component that is separate from the die.

Figure 7:
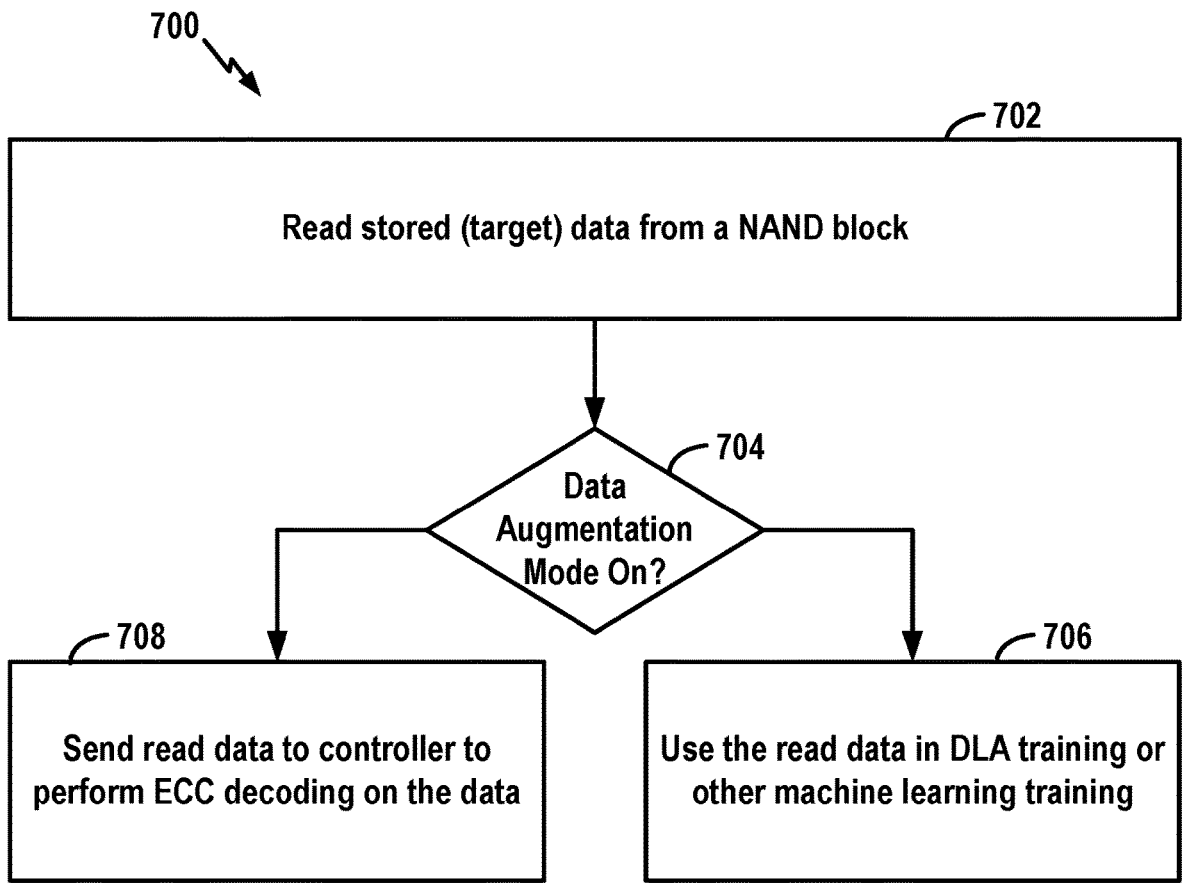
FIG. 7 illustrates a flow chart of an exemplary method according to aspects of the present disclosure for use in systems where error correction procedures are instead performed by a separate device controller.

As noted, in some systems, ECC is performed by a device controller that is separate from the NAND die (such as controller 108 of FIG. 1). FIG. 7 summarizes a method that may be performed by the die. Briefly, at block 702, the die reads stored (target) data from a NAND block (which might be image data for use in DLA training or might be other data). At decision block 704, the die determines whether a data augmentation mode is ON. If the data augmentation mode is ON, then at block 706, the die uses the read data in DLA training or other machine learning training. If data augmentation mode is OFF, the read data at block 708 is instead sent a controller (such as separate device controller 108 of FIG. 1 or a controller formed on the NAND) to perform ECC decoding on the data, so that the data can then be processed normally.

Figure 8:
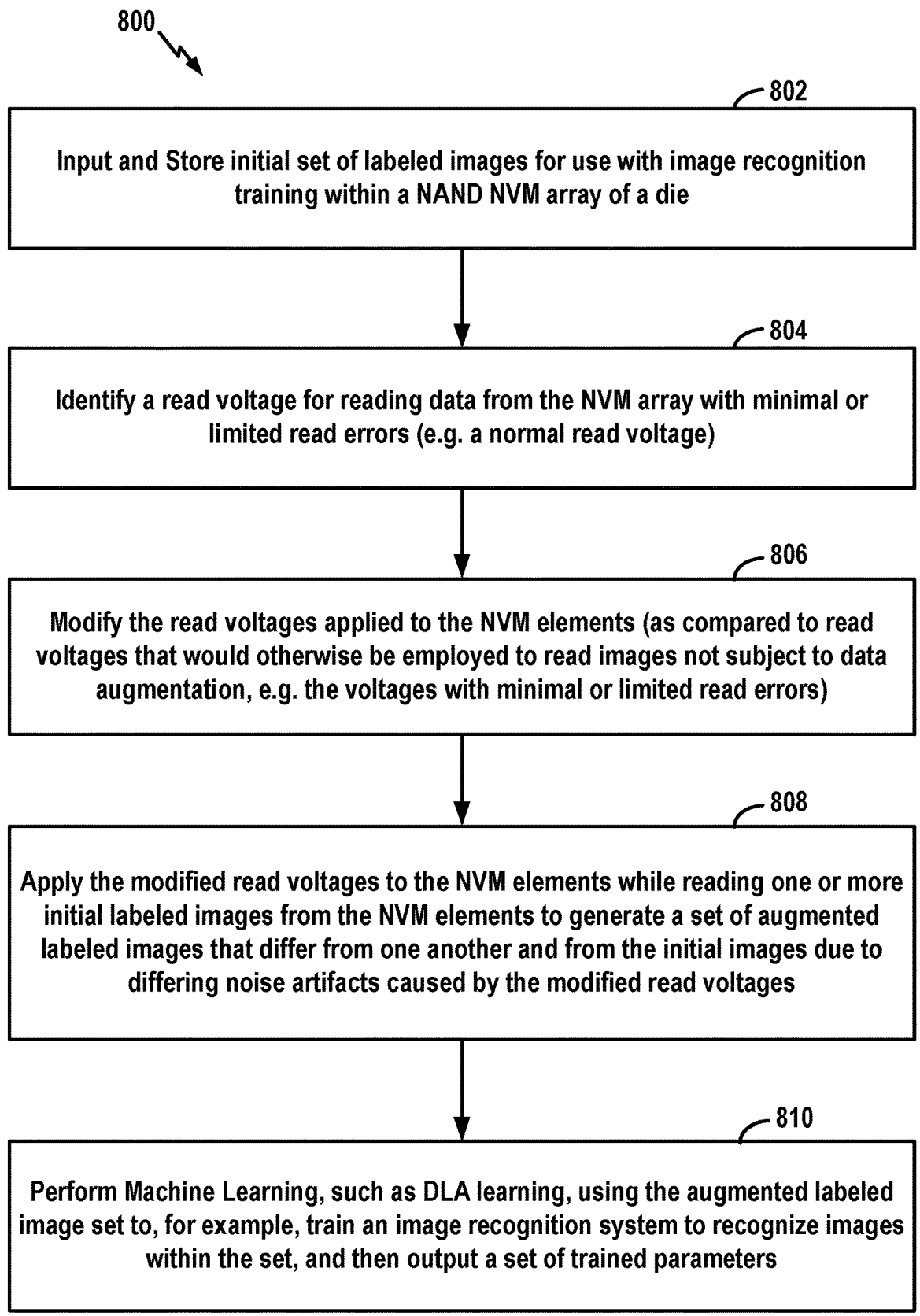
FIG. 8 illustrates a flow chart of an exemplary method according to aspects of the present disclosure for performing on-chip data augmentation of images by adjusting read voltages during data reads so as to obtain noisy images.

FIG. 8 illustrates an exemplary method 800 for data augmentation for use with image recognition according to aspects of the present disclosure where data augmentation is performed by modifying read voltages to inject noise into read images (or otherwise obtain a greater amount of read errors). Beginning at block 802, input circuitry of the NVM die inputs an initial set of labeled input images for use with image recognition training (or other forms of deep learning or machine learning) and stores the initial set of labeled input images within a NAND NVM array of the die. At block 804, control circuitry of the NVM die identifies a read voltage for reading data from the NVM array with minimal read errors (e.g. a normal read voltage set to achieve a low BER). At block 806, the control circuitry of the NVM die modifies the read voltages applied to its NVM elements (as compared to read voltages that would otherwise be employed to read images not subject to data augmentation, e.g. the voltages with minimal read errors identified at block 804). And so, in one example, if data is ordinarily read using an average threshold voltage of X volts, the modified read voltage might be 0.9X volts. At block 808, read circuitry of the NVM die applies the modified read voltages to the NVM elements while reading one or more of the initial labeled images from the NVM elements to generate a set of augmented labeled images that differ from one another and from the initial images due to differing noise artifacts caused by the modified read voltages. At 810, machine learning circuitry of the NVM die performs machine learning, such as DLA learning, using the augmented labeled image set to, e.g., train an image recognition system to recognize images within the set, and then output a set of trained parameters.

Figure 9:
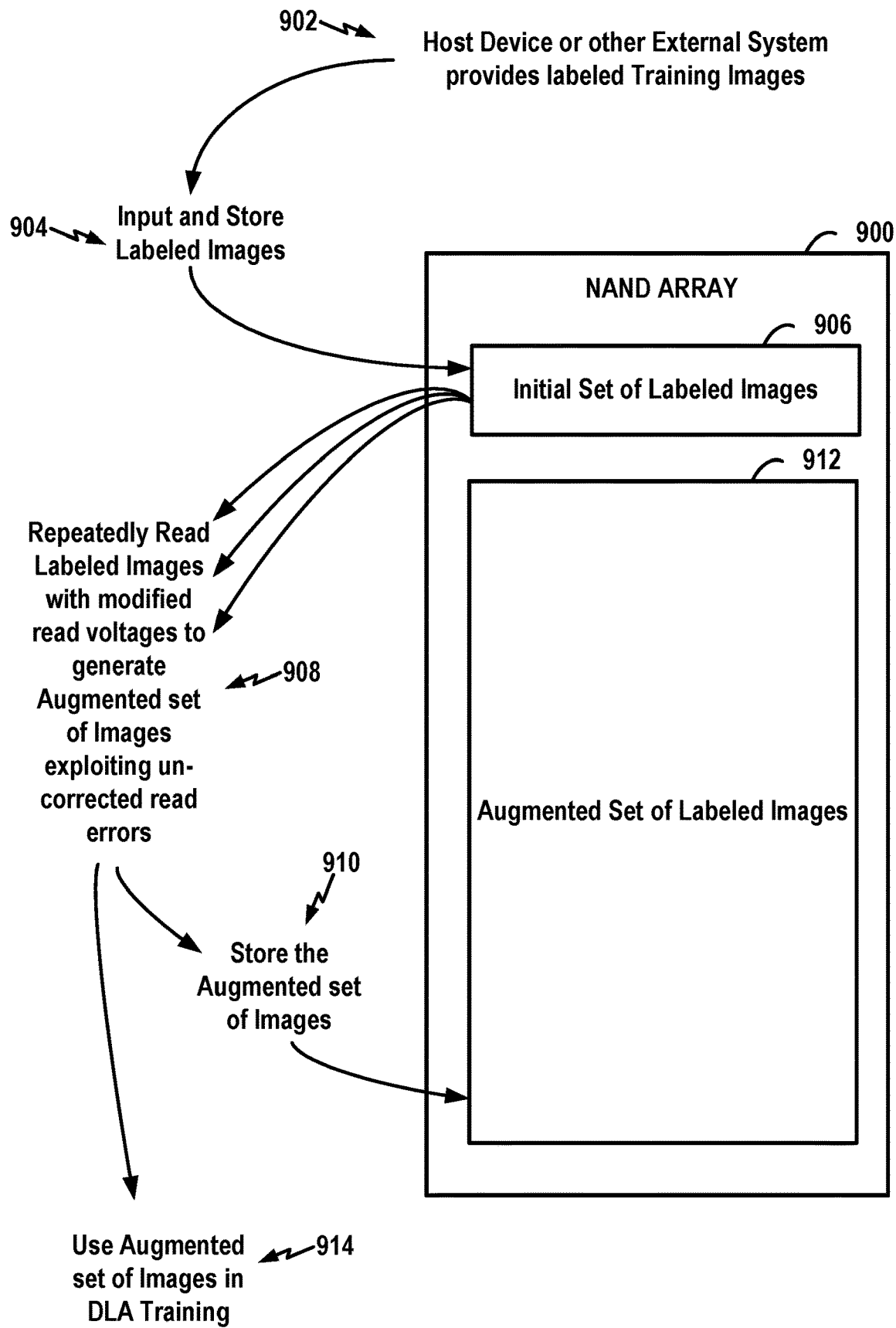
FIG. 9 illustrates a NAND array of an NVM die for storing image data and also schematically illustrating the read voltage-based data augmentation procedures of FIG. 8.

FIG. 9 illustrates a NAND array 900 of an NVM die (such as the die of FIG. 2) for storing image data and various procedures that manipulate and process the data using the methods of FIG. 8. At 902, a host device or other external system provides labeled training images. At 904, circuitry of the NVM die inputs and stores the labeled images within a first portion or first region 906 of the NAND array 900. Later, when a data augmentation procedure is initiated, circuitry of the NAND die: repeatedly reads the labeled images at 908 with the modified read voltages so as to provide or retain noise within the read images to thereby generate an augmented set of labeled images; and then stores the augmented set of images into a second region or second portion 912 of the NAND array 900 for subsequent use in training an image recognition system. Additionally or alternatively, at 914, the circuitry of the NAND die uses the augmented set of images (substantially) immediately to train an image recognition system. In FIG. 9, multiple arrows are shown leading from the first array portion 906 to emphasize that individual images stored therein can be repeatedly read with potentially different read voltages. Each separate read from the NAND array will generally result in different noise artifacts, where the noise artifacts are uncorrelated within one another, thus providing noise-based data augmentation or noise-augmented data sets.

Figure 10:
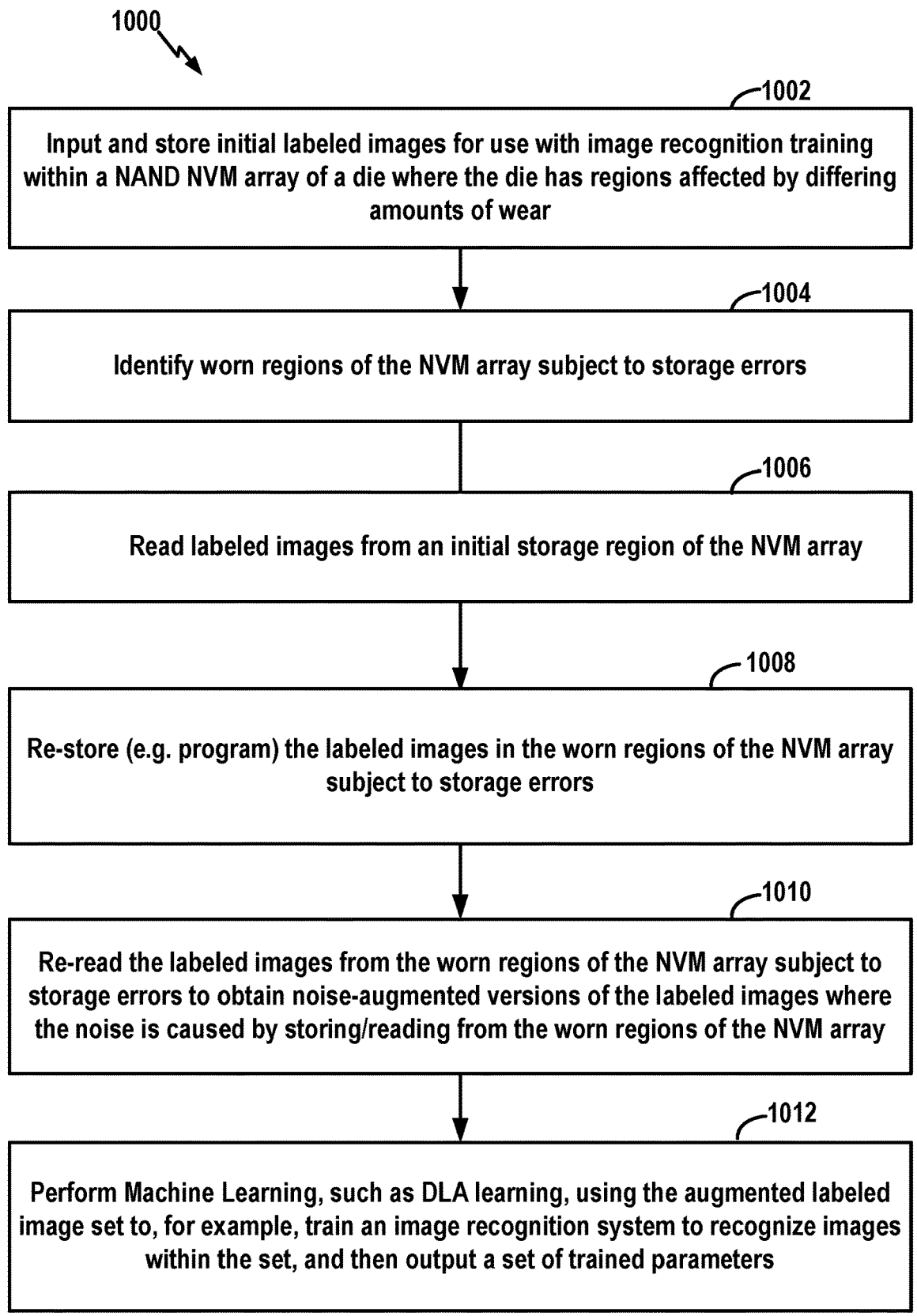
FIG. 10 illustrates a flow chart of an exemplary method according to aspects of the present disclosure for performing on-chip data augmentation of images by storing and then reading image data within worn regions of the NVM die so as to obtain noisy images.

FIG. 10 illustrates an exemplary method 1000 for data augmentation for use with image recognition according to aspects of the present disclosure where data augmentation is performed by repeatedly writing (initially un-augmented) data to worn regions of the NVM and then reading the data from the worn regions of the NVM to thereby inject noise into the images. Beginning at block 1002, input circuitry of the NVM die inputs an initial set of labeled input images for use with image recognition training (or other forms of deep learning or machine learning) and stores the initial set of labeled input images within a NAND NVM array of the die, where the die has regions affected by differing amounts of wear. At 1004, control circuitry of the NVM die identifies worn regions of the NVM array that are subject to storage errors. Any suitable technique can be used to identify worn areas of the NVM array, such as by tracking the BER of data read from various blocks. At block 1006, read circuitry of the NVM die reads labeled images from an initial storage region of the NVM array and, at block 1008, write (program)

circuitry of the NVM die re-stores the labeled images in the worn regions of the NVM subject to storage errors. At block 1010, read circuitry of the NVM die re-reads the labeled images from the worn regions of the NVM array to thereby obtain noise-augmented versions of the labeled images where the noise is caused by storing/reading from the worn regions of the NVM array that have high BER. At 1012, machine learning circuitry of the NVM die performs machine learning, such as DLA learning, using the augmented labeled image set to, e.g., train an image recognition system to recognize images, and then output a set of trained parameters.

Figure 11:
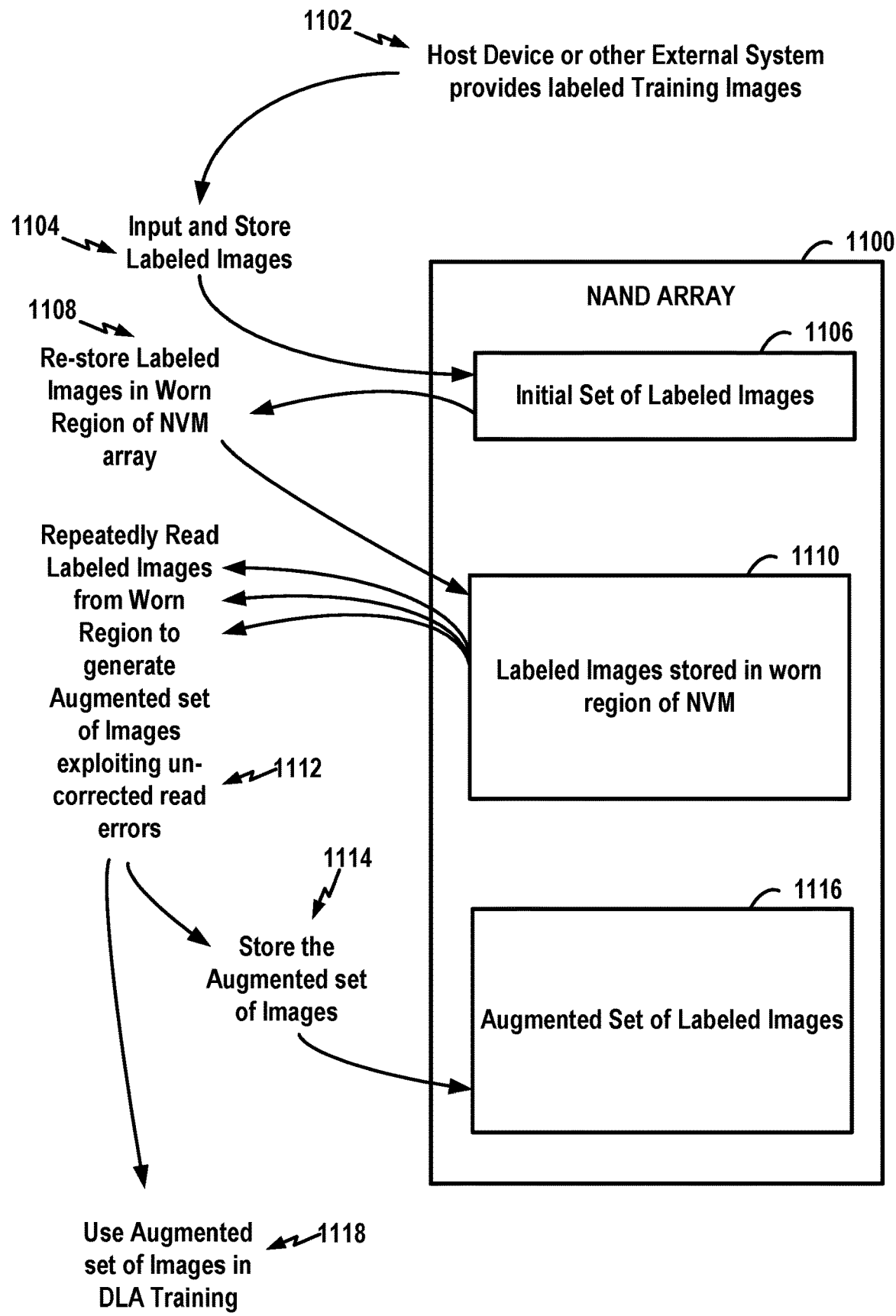
FIG. 11 illustrates a NAND array of an NVM die for storing image data and also schematically illustrating the worn region-based data augmentation procedures of FIG. 10.

FIG. 11 illustrates a NAND array 1100 of an NVM die (such as the die of FIG. 2) for storing image data and various procedures that manipulate and process the data using the methods of FIG. 10. At 1102, a host device or other external system provides labeled training images. At 1104, circuitry of the NVM die inputs and stores the labeled images within a first (non-worn) region 1106 of the NAND array 1100. Later, at 1108, when a data augmentation procedure is initiated, circuitry of the NVM die re-stores the labeled images in a worn region 1110 of the NAND array. At 1112, read circuitry of the NVM die repeatedly reads the labeled images from the worn region 1110 so as to thereby generate an augmented set of labeled images exploiting un-corrected read errors. At 1114, circuitry of the NVM die stores the augmented set of images into another region 1116 of the NAND array 1100 for subsequent use in training an image recognition system. Additionally or alternatively, at 1118, the circuitry of the NAND die uses the augmented set of images (substantially) immediately to train an image recognition system. In FIG. 11, multiple arrows are shown leading from worn array portion 1110 to emphasize that individual images stored therein can be repeatedly read. Each separate read from the NAND array will generally result in different noise artifacts due to the worn characteristics of the array region 1110, where the noise artifacts are uncorrelated within one another, thus providing for noise-augmented data sets.

In the following, various general exemplary procedures and systems are described for on-chip (NVM-based) data augmentation.

Figure 12:
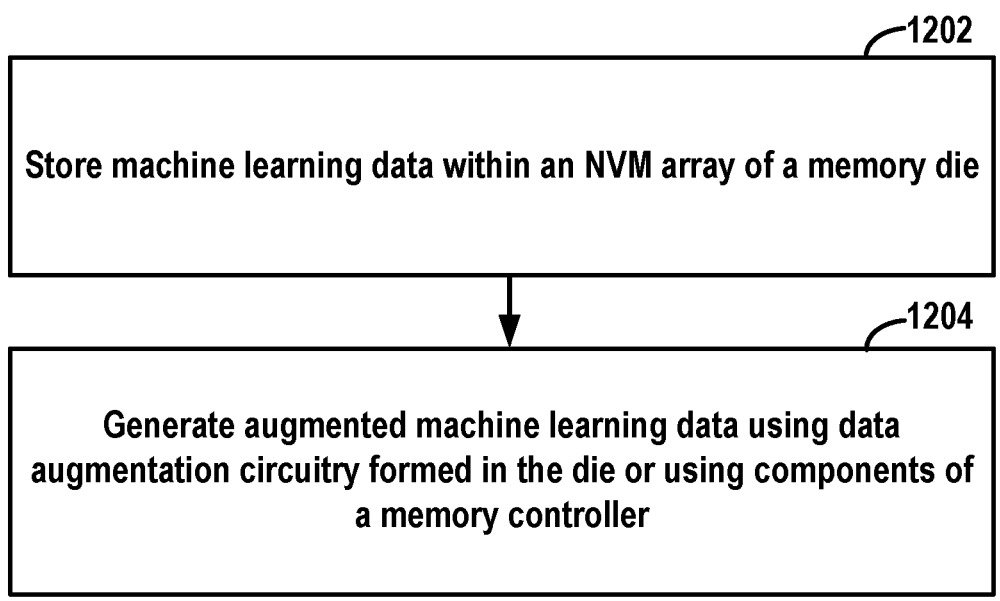
FIG. 12 illustrates a flow chart that summarizes exemplary on-chip data augmentation operations performed by an NVM die.

Additional Exemplary Methods and Apparatus Employing NVM-Based Data Augmentation FIG. 12 broadly illustrates a process 1200 in accordance with some aspects of the disclosure. The process 1200 may take place within any suitable apparatus or device having a die capable of performing the operations, such as a NAND die. At block 1202, the memory die (e.g. a suitably-configured NAND die) stores machine learning data within the NVM array of the memory die. At block 1204, the die generates augmented machine learning data using data augmentation circuitry formed in the memory die or using components of a memory controller. Examples are described above. Insofar as using components of a memory controller is concerned, by way of example, ECC components of the memory controller may be configured or controlled to permit or facilitate the creation of augmented data sets by deactivating or reducing ECC.

Figure 13:
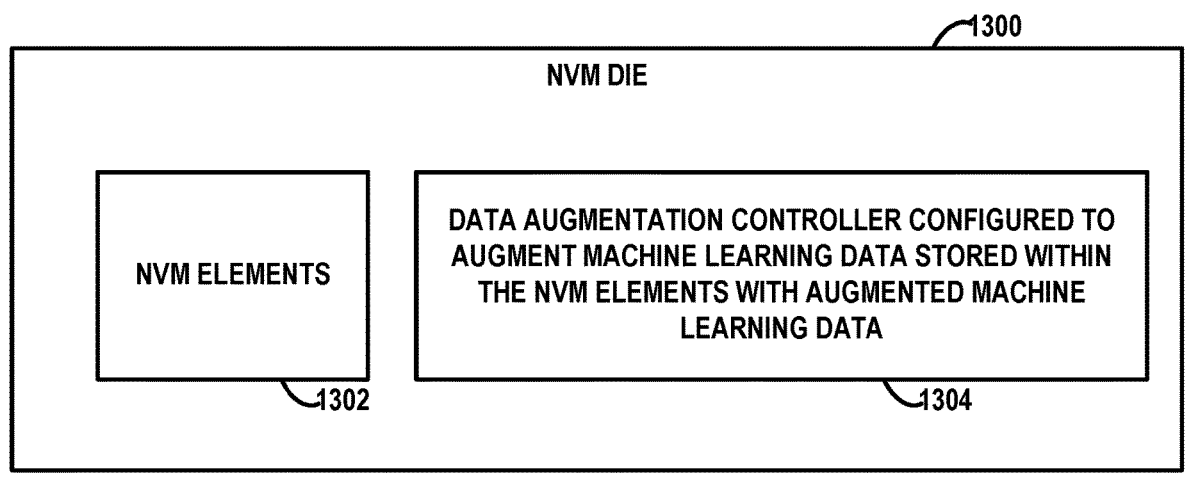
FIG. 13 illustrates a schematic block diagram configuration for an exemplary NVM apparatus such as a NAND die.

FIG. 13 broadly illustrates an embodiment of an apparatus 1300 configured according to one or more aspects of the disclosure. The apparatus 1300, or components thereof, could embody or be implemented within a NAND die or some other type of NVM device that supports data storage. The apparatus 1300 includes NVM elements 1302 and a data augmentation controller 1304 configured to augment machine learning data stored within the NVM elements 1302 with augmented machine learning data. Examples of the apparatus are described above. Additional examples are described below. As noted, at least some data augmentation components may be separate from the die, such as ECC components of a NAND device controller.

Figure 14:
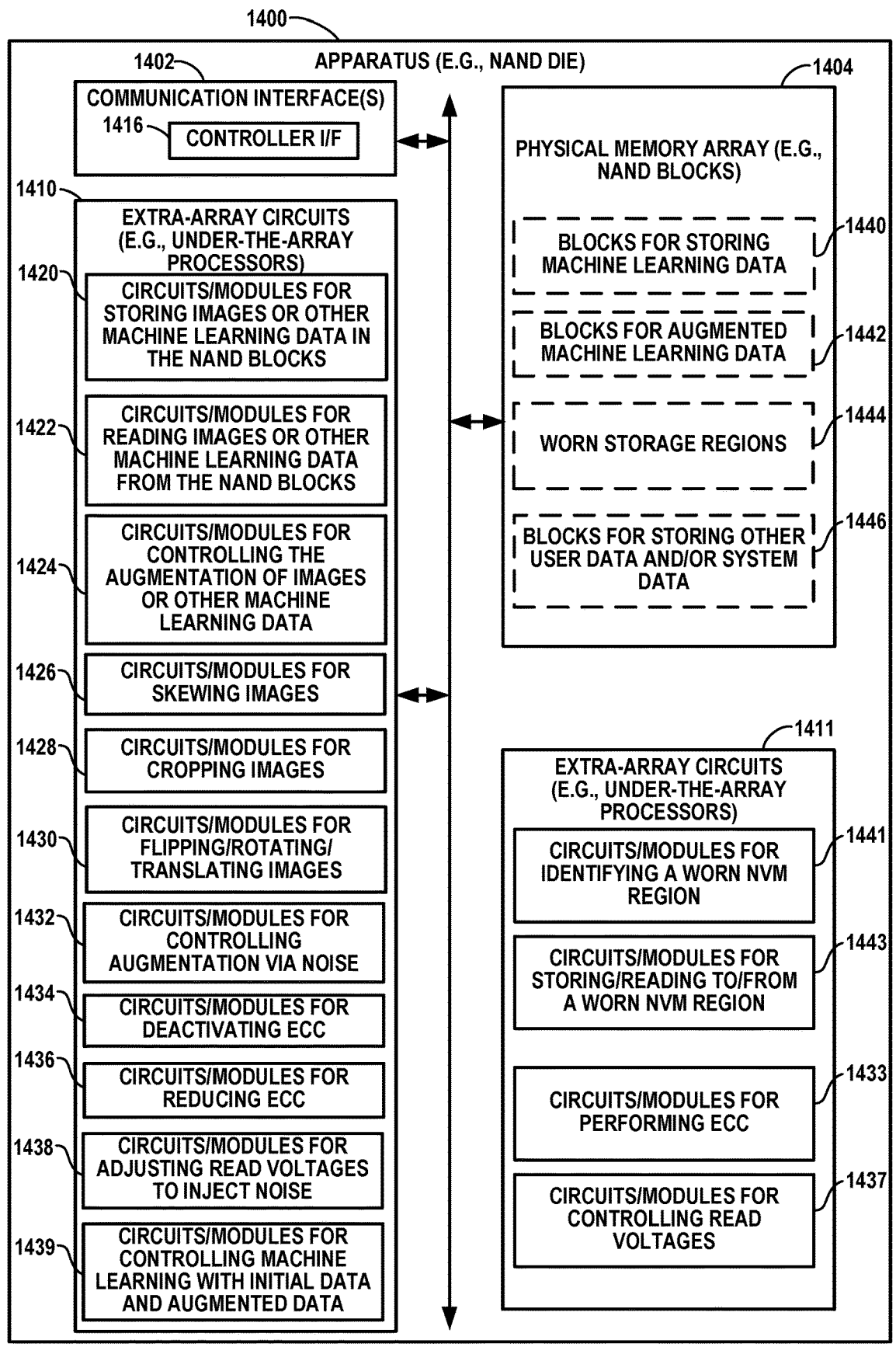
FIG. 14 illustrates a schematic block diagram providing further details of an exemplary NVM die and its on-chip components.

FIG. 14 illustrates an embodiment of an apparatus 1400 configured according to one or more aspects of the disclosure. The apparatus 1400, or components thereof, could embody or be implemented within a NAND die or some other type of NVM device that supports data storage. In various implementations, the apparatus 1400, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes or uses neural data.

The apparatus 1400 includes a communication interface 1402, a physical memory array (e.g., NAND blocks) 1404, and extra-array processing circuits 1410, 1411 (e.g. under-the-array or next-to-the-array circuits). These components can be coupled to and/or placed in electrical communication with one another via suitable components, represented generally by the connection lines in FIG. 14. Although not shown, other circuits such as timing sources, peripherals, voltage regulators, and power management circuits may be provided, which are well known in the art, and therefore, will not be described any further.

The communication interface 1402 provides a means for communicating with other apparatuses over a transmission medium. In some implementations, the communication interface 1402 includes circuitry and/or programming (e.g., a program) adapted to facilitate the communication of information bi-directionally with respect to one or more devices in a system. In some implementations, the communication interface 1402 may be configured for wire-based communication. For example, the communication interface 1402 could be a bus interface, a send/receive interface, or some other type of signal interface including circuitry for outputting and/or obtaining signals (e.g., outputting signal from and/or receiving signals into an SSD). The communication interface 1402 serves as one example of a means for receiving and/or a means for transmitting.

The physical memory array 1404 may represent one or more NAND blocks. The physical memory array 1404 may be used for storing data such images that are manipulated by the circuits 1410, 1411 or some other component of the apparatus 1400. The physical memory array 1404 may be coupled to the circuits 1410, 1411 such that the circuits 1410, 1411 can read or sense information from, and write or program information to, the physical memory array 1404. That is, the physical memory array 1404 can be coupled to the circuits 1410, 1411 so that the physical memory array 1404 is accessible by the circuits 1410, 1411.

The circuits 1410, 1411 are arranged or configured to obtain, process and/or send data, control data access and storage, issue or respond to commands, and control other desired operations. For example, the circuits 1410, 1411 may be implemented as one or more processors, one or more controllers, and/or other structures configured to perform functions. According to one or more aspects of the disclosure, the circuits 1410, 1411 may be adapted to perform any or all of the extra-array features, processes, functions, operations and/or routines described herein. For example, the circuits 1410 may be configured to perform any of the steps, functions, and/or processes described with respect to FIGS.

2-13. As used herein, the term "adapted" in relation to the processing circuits 1410, 1411 may refer to the circuits being one or more of configured, employed, implemented, and/or programmed to perform a particular process, function, operation and/or routine according to various features described herein. The circuits may include a specialized processor, such as an application specific integrated circuit (ASIC) that serves as a means for (e.g., structure for) carrying out any one of the operations described in conjunction with FIGS. 2-13. The circuits serve as an example of a means for processing. In various implementations, the circuits may provide and/or incorporate, at least in part, functionality described above for the components in various embodiments shown, including for example element 204 of FIG. 2.

According to at least one example of the apparatus 1400, the processing circuit 1410, 1411 may include one or more of: circuit/modules 1420 configured for storing images or other machine learning data in the NAND blocks; circuits/modules 1422 configured for reading images or other machine learning data from the NAND blocks; circuits/modules 1424 configured for controlling the augmentation of images or other machine learning data; circuits/modules 1426 configured for skewing images; circuits/modules 1428 configured for cropping images; circuits/modules 1430 configured for flipping/rotating/translating images; circuits/modules 1432 configured for controlling augmentation via noise; circuits/modules 1433 configured for performing ECC; circuits/modules 1434 configured for deactivating ECC; circuits/modules 1436 configured for reducing ECC; circuits/modules 1437 configured for controlling read voltages; circuits/modules 1438 configured for adjusting read voltages to inject noise; circuits/modules 1439 configured for controlling machine learning with initial data and augmented data; circuits/modules 1441 configured for identifying a worn NVM region; and circuits/modules 1443 configured for storing data to and/or reading data from a worn NVM region storage/read component.

As shown in FIG. 14, the physical memory array 1404 may include one or more of: blocks 1440 for storing machine learning data, such as input labeled images; blocks 1442 for storing augmented versions of the machine learning data; blocks 1444 that are worn regions; and blocks 1446 for storing other user data or system data (e.g. data pertaining to the overall control of operations of the NAND die).

In at least some examples, means may be provided for performing the functions illustrated in FIG. 14 and/or other functions illustrated or described herein. For example, the means may include one or more of: means, such as circuit/module 1420, for storing images or other machine learning data in the NAND blocks; means, such as circuits/modules 1422, for reading images or other machine learning data from the NAND blocks; means, such as circuits/modules 1424, for controlling the augmentation of images or other machine learning data; means, such as circuits/modules 1426, for skewing images; means, such as circuits/modules 1428, for cropping images; means, such as circuits/modules 1430, for flipping/rotating/translating images; means, such as circuits/modules 1432, for controlling augmentation via noise; means, such as circuits/modules 1433, for performing ECC; means, such as circuits/modules 1434, for deactivating ECC; means, such as circuits/modules 1436, for reducing ECC; means, such as circuits/modules 1437, for controlling read voltages; means, such as circuits/modules 1438, for adjusting read voltages to inject noise; means, such as circuits/modules 1439, for controlling machine learning with initial data and augmented data; means, such as circuits/modules 1441, for identifying a worn NVM region; means, such as circuits/modules 1443, for storing data to and/or reading data from a worn NVM region storage/read component; means, such as NAND blocks 1440, for storing machine learning data; means, such as NAND blocks 1442, for storing augmented versions of the machine learning data; and means, such as NAND blocks 1446, for storing other user data or system data (e.g. data pertaining to the overall control of operations of the NAND die).

In other examples, means, such as NVM elements 1202 of FIG. 2 that are formed in a die, are provided for storing machine learning data within the NVM array of the die; and means, such as data augmentation component 210 of FIG. 2 that are also formed in the die, are provided for generating at least one augmented version of the machine learning data.

What have been described with reference to FIGS. 1-14 are illustrative embodiments where data augmentation is performed by on-chip NVM die components. In the following, illustrative embodiments are described where data augmentation is performed by storage controller components using data obtained from NVM dies.

Figure 15:
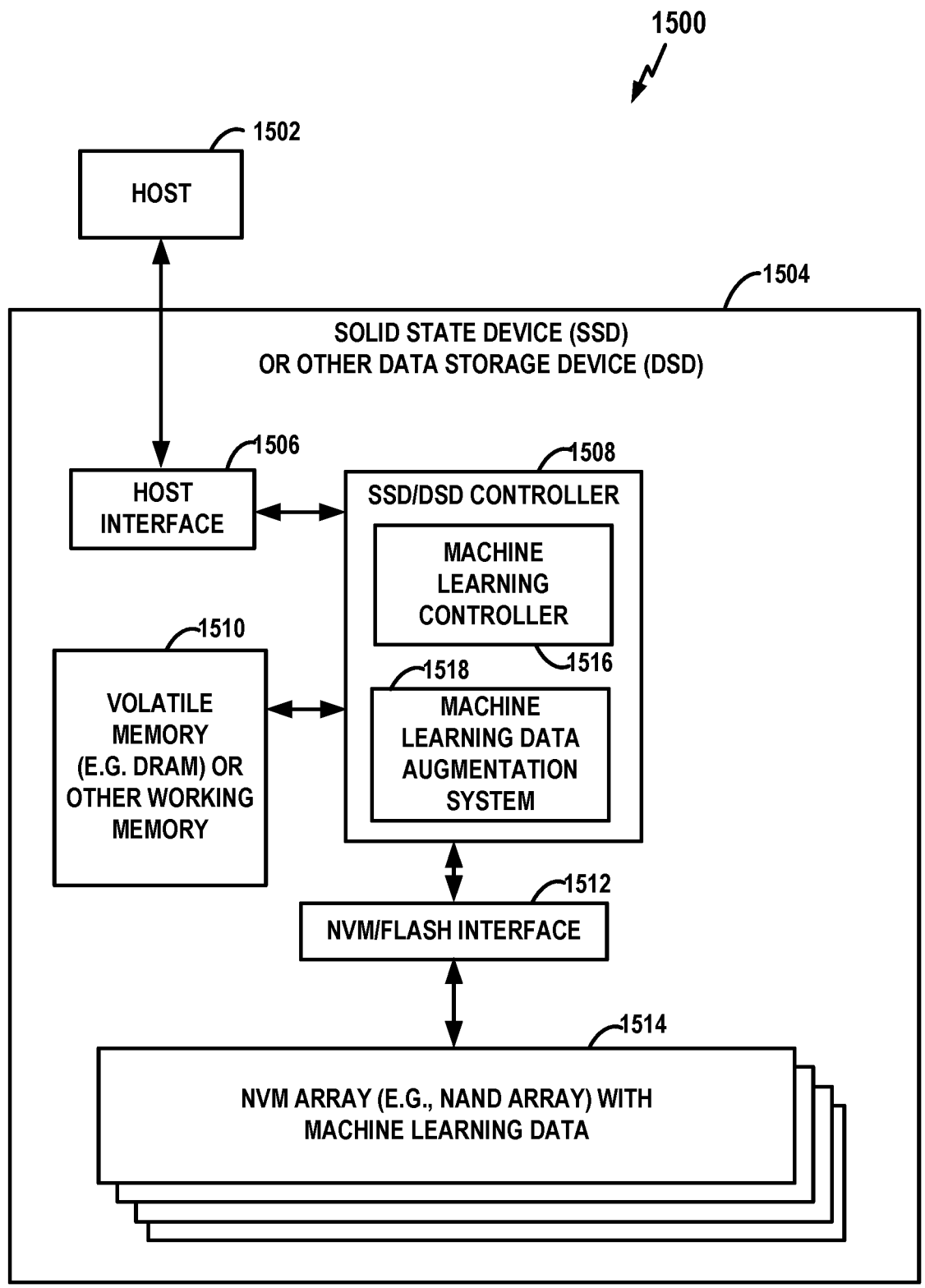
FIG. 15 illustrates a schematic block diagram configuration for exemplary SSD or other DSD having a controller and one or more NVM arrays, where the controller includes data augmentation components.

Exemplary Methods/Apparatus Employing Storage Controller-Based Data Augmentation FIG. 15 is a block diagram of a system 1500 including an exemplary SSD or other DSD having a storage controller with machine learning data augmentation components. The system 1500 includes a host 1502 and a SSD or other DSD 1504 coupled to the host 1502. Many of the components of system 1500 are similar to those of system 100 of FIG. 1 and will not be described again in detail. The SSD 1504 includes a host interface 1506, a controller 1508, a volatile or working memory 1510 (e.g. DRAM), an NVM interface 1512 (e.g. flash interface), and an NVM array 1514 (having one or more dies) for storing machine learning data such as training images for a DNN.

In the example of FIG. 15, the controller 1508 includes machine learning data augmentation system 1518 in the form of hardware, firmware, software, or any combinations thereof that perform data augmentation of machine learning data obtained from the NVM array 1514 (where the NVM array 1514, in some examples, may include at least some on-chip data augmentation components on the die(s) such as discussed above in connection with FIGS. 1-14). Although FIG. 15 shows an example SSD and an SSD is generally used as an illustrative example in these descriptions, the various disclosed embodiments are not necessarily limited to an SSD application/implementation. Other DSD examples were noted above. In one or more embodiments, the controller 1508 is also tasked with performing data storage and data management functions, such as performing various read and write operations in response to commands from the host 1502.

In examples that have two or more memory dies, machine learning data stored on the various NVM dies may be transferred in parallel to the controller 1508 for use by its data augmentation components. In this manner, multiple images (or other types of machine learning input data) may be provided concurrently (e.g. substantially simultaneously) and in parallel by the plurality of NVM dies to the controller 1508. The parallelism can increase overall processing efficiency, e.g. provide for faster processing.

Figure 16:
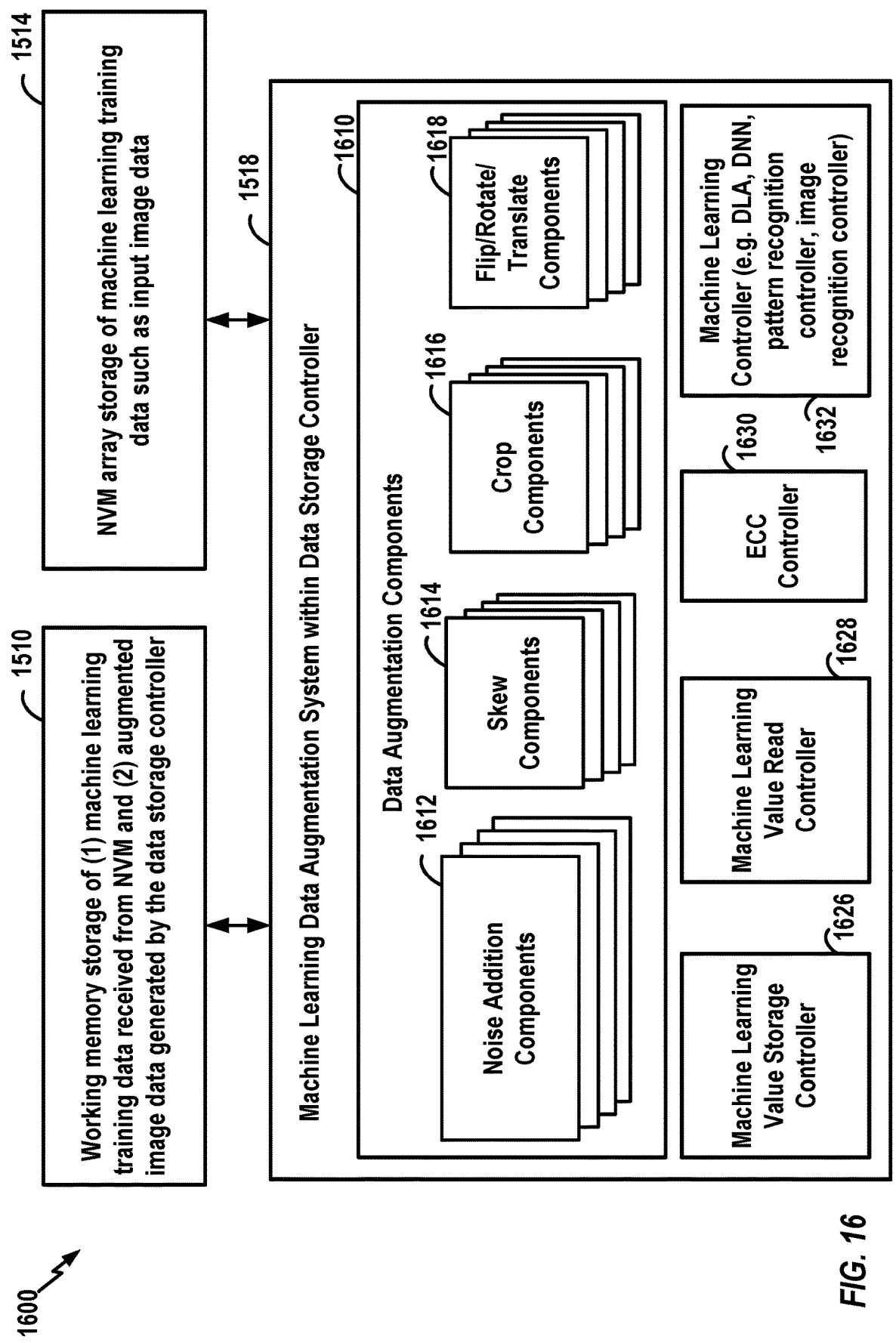
FIG. 16 illustrates an example of data storage controller having components configured for data augmentation processing.

FIG. 16 illustrates a block diagram of the exemplary machine learning data augmentation system 1518 of the data storage controller 1508. FIG. 16 also illustrates the working memory 1510 (e.g. RAM or DRAM) that provides temporary storage of (1) machine learning training data (such as input image data received from NVM array 1514) and (2)

augmented image data generated by the data augmentation system 1518. FIG. 16 also illustrates the exemplary NVM array 1514 that stores machine learning training data such as input image data.

The data augmentation system 1518 includes data augmentation components 1610 configured to perform or control data augmentation operations. In the example of FIG. 16, the exemplary data augmentation components 1610 include one or more of: one or more noise addition components 1612 configured to generate augmented machine learning data by adding noise to initial machine learning data, such as by adding uncorrelated noise to each of an initial set of labeled training images; one or more skew components 1614 configured to generate augmented machine learning data by skewing initial machine learning data, such as by skewing each of an initial set of labeled training images in a different manner; one or more crop components 1616 configured to generate augmented machine learning data by cropping initial machine learning data, such as by cropping each of an initial set of labeled training images in a different manner; one or more flip/rotate/translate components 1618 configured to generate augmented machine learning data by flipping, rotating and/or translating initial machine learning data, such as by flipping, rotating and/or translating each of an initial set of labeled training images in a different manner. These components may be the same or similar to the corresponding components of the on-chip data augmentation components described above.

Multiple instances of each augmentation component (1612, 1614, 1616, and 1618) are shown since, in some examples, a plurality of such devices may operate in parallel. For example, N noise addition components 1612 may be provided to concurrently process N different input training images to generate a set of augmented images from each of the N different input training images. In other examples, only a single instance of each component is provided. In still other examples, only one or a few of the illustrated components are provided. In yet other examples, other augmentation components are additionally or alternatively provided. Note also that the exemplary components of FIG. 16 primarily relate to the augmentation of image data. For examples where the data is not image data but, for example, audio data, different augmentation components may be provided that are appropriate to the type of data.

The data augmentation system 1518 of FIG. 16 includes various other components such as: a machine learning value storage controller 1626 configured to store machine learning data in the working memory 1510 and/or the NVM 1514; a machine learning value read controller 1628 configured to read previously-stored machine learning data from the NVM array 1514; and an ECC controller 1630 configured to control any ECC applied to data obtained from the NVM array 1514 to address BER or other issues. As already explained, certain types of data augmentation can be performed by adjusting ECC or, in some cases, deactivating ECC so as to increase the BER to selectively add noise into images. That is, the data augmentation system 1518 of the data storage controller may be configured to generate augmented data by reducing an amount of error correction performed by the error correction components compared to an average amount of error correction that would otherwise be employed to read data not subject to data augmentation, and then reading stored data from the NVM array 1514 with the reduced error correction. If the NVM die itself is equipped for performing ECC procedures, those procedures can be deactivated or modified by the date augmentation system 1518 to increase the noise in the data read from the NAND arrays to provide augmented image data.

FIG. 16 also illustrates a machine learning controller 1632, which may be, e.g., a DLA, DNN, pattern recognition controller, image recognition controller, etc., configured to perform some form of machine learning using augmented data. In some examples, the augmented data is stored in the NVM array 1514 for later use. In other examples, augmented data is held in working memory 1510 for use by training components, and then erased or overwritten. That is, in some examples, the augmented data may be transient data that is saved only as long as it is needed to train a machine learning system (e.g. a DNN) and then discarded.

In the following, various exemplary data augmentation systems and procedures are described where data augmentation performed by the data storage controller is used to train image or pattern recognition systems.

FIG. 17 illustrates an exemplary method 1700 for data augmentation operations performed by a data storage controller such as controller 1508 for use with image recognition according to aspects of the present disclosure where any of the aforementioned forms of data augmentation may be applied (e.g. skewing, rotating, etc.). Beginning at block 1702, the data storage controller stores an initial set of labeled (or tagged) input images within a NAND NVM array of a die coupled to the data storage controller. The input images may be provided by a host device for use with image recognition training (or for use with other forms of deep learning or machine learning). Thereafter, at 1704, when the data storage controller is set to perform data augmentation (based, for example, on control signals received from the host), the data storage controller reads one or more of the labeled images from the NAND NVM array. At 1706, the data storage controller generates a set of altered versions of the labeled images by, e.g., rotating, translating, skewing, cropping, flipping, and/or adding noise to the labeled images read from the NAND NVM array to provide an augmented image set. At 1708, the data storage controller performs machine learning, such as DLA learning, using the augmented image set to, e.g., train an image recognition system to recognize images within the augmented image set, and then outputs a set of trained parameters to the host (or stores the trained parameters in the NAND NVM array). In some examples, the parameters may include synaptic weights, bias values, etc., for use with a DNN configured for image recognition.

Figure 18:
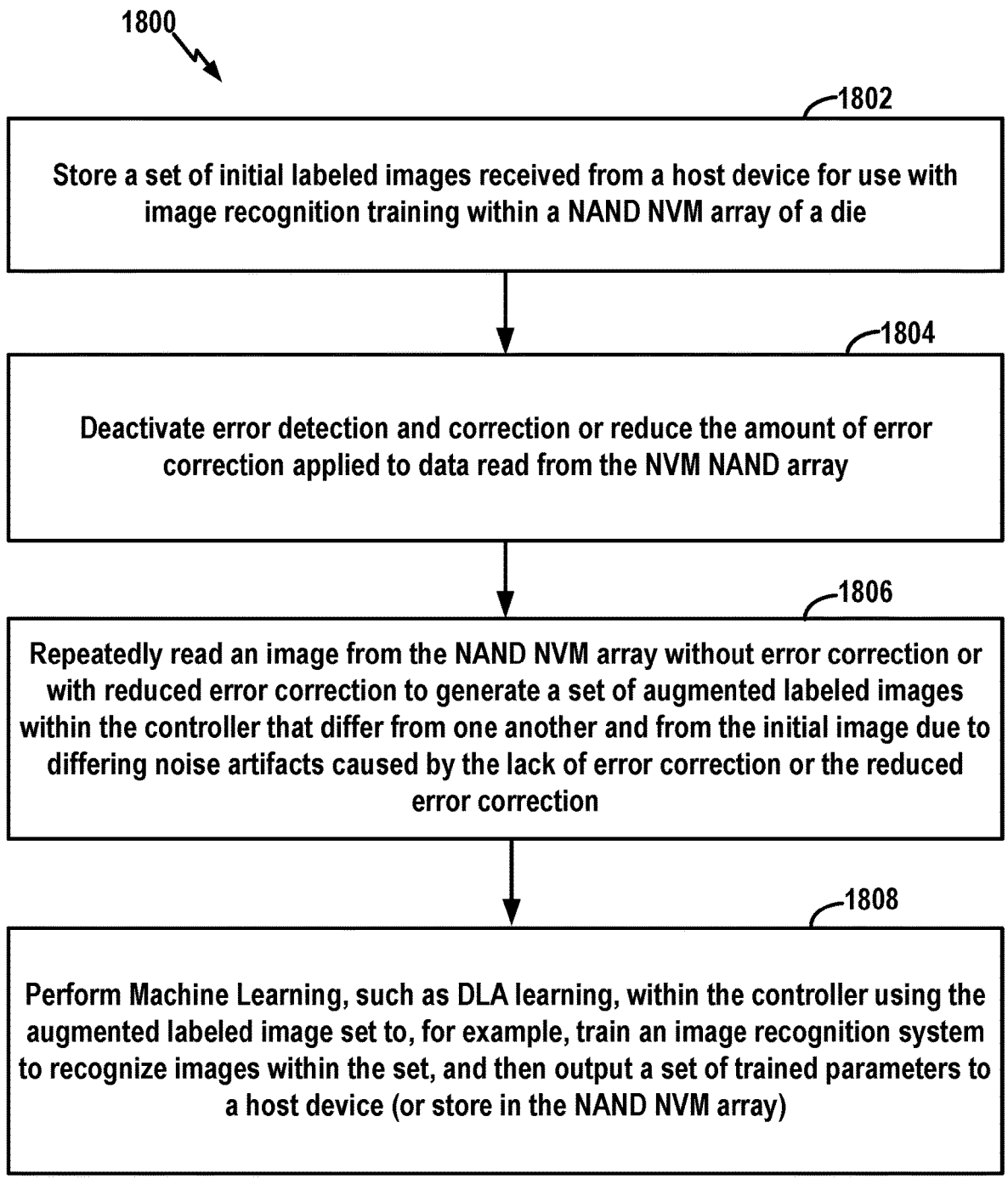
FIG. 18 illustrates a flow chart of an exemplary method according to aspects of the present disclosure for performing data augmentation of image data using a data storage controller by deactivating or reducing error correction procedures so as to obtain noisy images.

FIG. 18 illustrates an exemplary method 1800 for data augmentation performed by a data storage controller for use with image recognition according to aspects of the present disclosure where data augmentation is performed by deactivating or at least reducing the use of ECC (or other error correction systems or procedures). Beginning at block 1802, the data storage controller stores an initial set of labeled input images received from a host device within a NAND NVM array of a die. At 1804, the data storage controller deactivates error detection and correction procedures or otherwise reduces the amount (or effectiveness) of error correction applied to data read from the array so as to selectively increase the effective BER. At 1806, the data storage controller repeatedly reads an image from the NAND NVM array without error correction or with reduced error correction to generate a set of augmented labeled images that differ from one another and from the initial image due to differing noise artifacts caused by the lack of error correction or the reduced error correction. At 1808, the data storage controller performs machine learning, such as DLA learning, using the augmented labeled image set to, e.g., train an image recognition system to recognize images within the set, and then outputs a set of trained parameters to the host (or stores the trained parameters in the NAND NVM).

Figure 19:
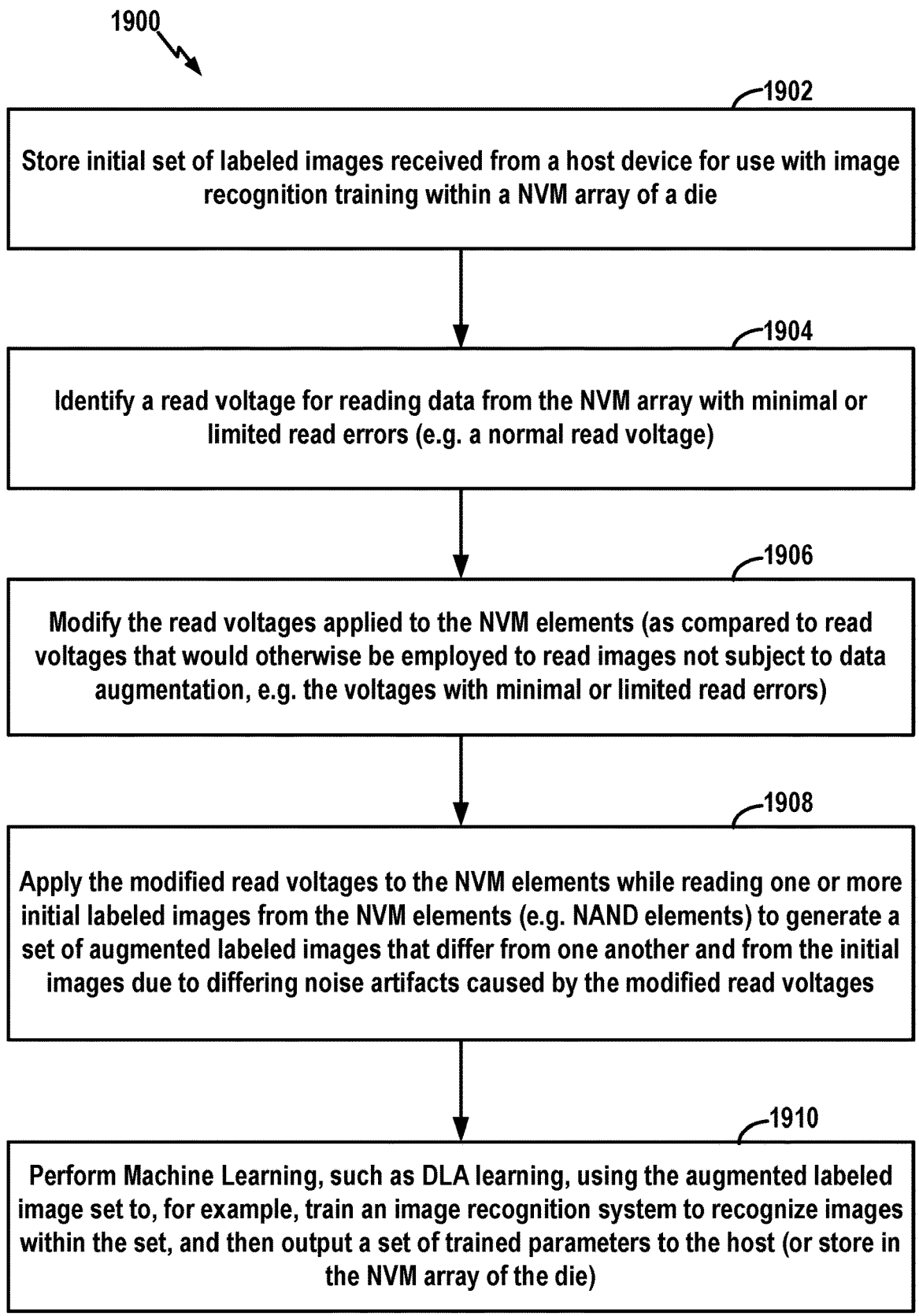
FIG. 19 illustrates a flow chart of an exemplary method according to aspects of the present disclosure for performing data augmentation of images using a data storage controller by adjusting NVM read voltages during data reads so as to obtain noisy images.

FIG. 19 illustrates an exemplary method 1900 for data augmentation performed by a data storage controller for use with image recognition according to aspects of the present disclosure where data augmentation is performed by modifying NVM read voltages to inject noise into read images (or otherwise obtain a greater amount of read errors). Beginning at block 1902, the data storage controller stores an initial set of labeled input images received from a host device for use within image recognition training within a NVM array of the die. At block 1904, the data storage controller identifies a read voltage for reading data from the NVM array with minimal read errors (e.g. a normal read voltage set to achieve a low BER). At block 1906, the data storage controller modifies the read voltages to be applied to the NVM (as compared to read voltages that would otherwise be employed to read images not subject to data augmentation, e.g. the voltages with minimal read errors identified at block 1904). At block 1908, the data storage controller controls the read circuitry of the NVM die to apply the modified read voltages to the NVM elements while reading one or more of the initial labeled images from the NVM elements (e.g. NAND elements) to generate a set of augmented labeled images that differ from one another and from the initial images due to differing noise artifacts caused by the modified read voltages. At 1910, the data storage controller performs machine learning, such as DLA learning, using the augmented labeled image set to, e.g., train an image recognition system to recognize images within the set, and then outputs a set of trained parameters to the host (or stores the parameters in the NVM array).

Figure 20:
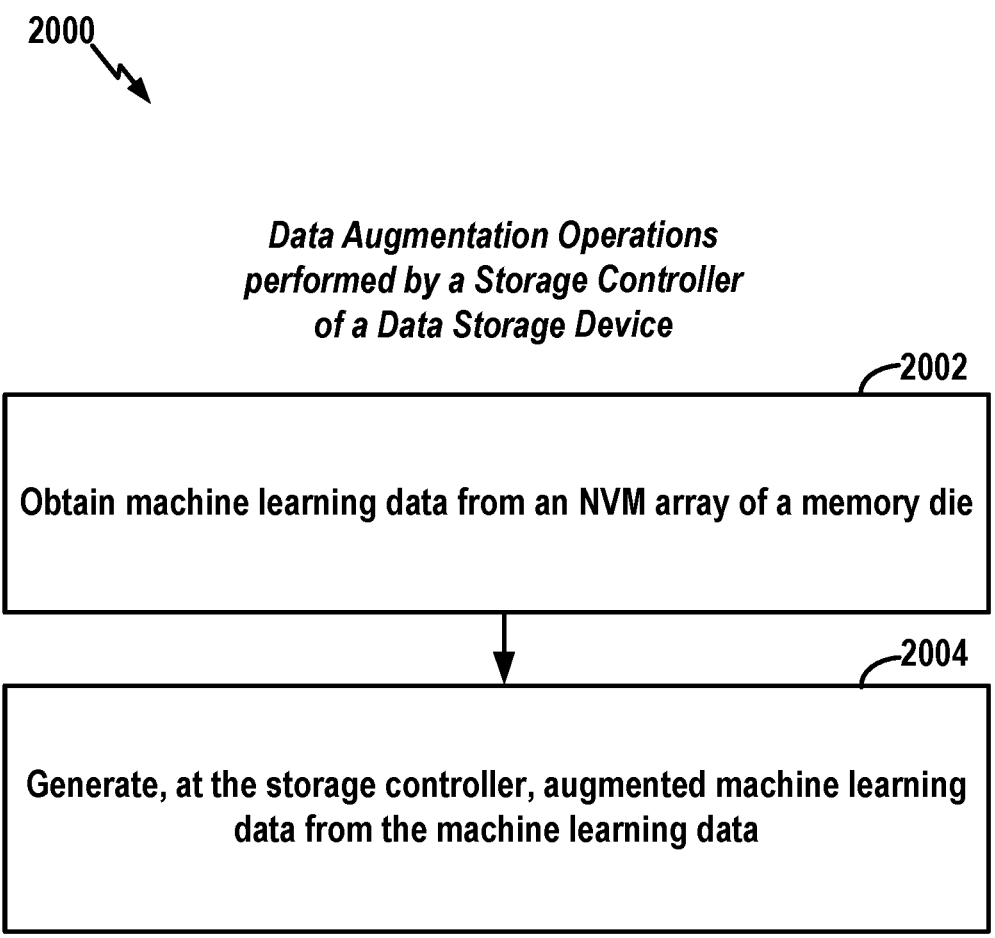
FIG. 20 illustrates a flow chart that summarizes exemplary data augmentation operations performed by a storage controller.

FIG. 20 broadly illustrates a process 2000 in accordance with some aspects of the disclosure. The process 2000 may take place within any suitable apparatus or device having a data storage controller capable of performing the operations and coupled to an NVM array such as a NAND die. At block 2002, the data storage controller obtains machine learning data from an NVM array of a memory die. At block 2004, the data storage controller generates augmented machine learning data from the machine learning data.

Figure 21:
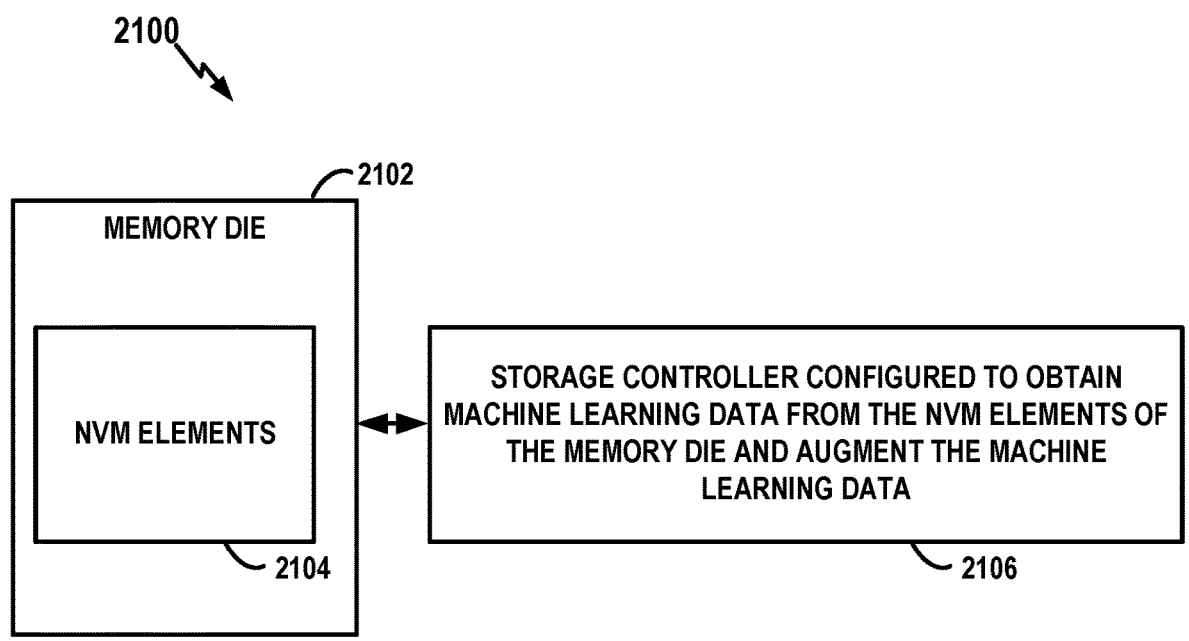
FIG. 21 illustrates a schematic block diagram configuration for an exemplary die and storage controller configured to augment machine learning data obtained from the die.

FIG. 21 broadly illustrates an embodiment of an apparatus 2100 configured according to one or more aspects of the disclosure. The apparatus 2100, or components thereof, could embody or be implemented within an SSD or more generally, DSD, having a NAND die or some other type of NVM device that supports data storage. The apparatus 2100 includes a memory die 2012 having NVM elements 2104. The apparatus 2100 also includes a storage controller 2106 configured to obtain machine learning data from the NVM elements 2104 of the memory die 2102 and augment the machine learning data.

Figure 22:
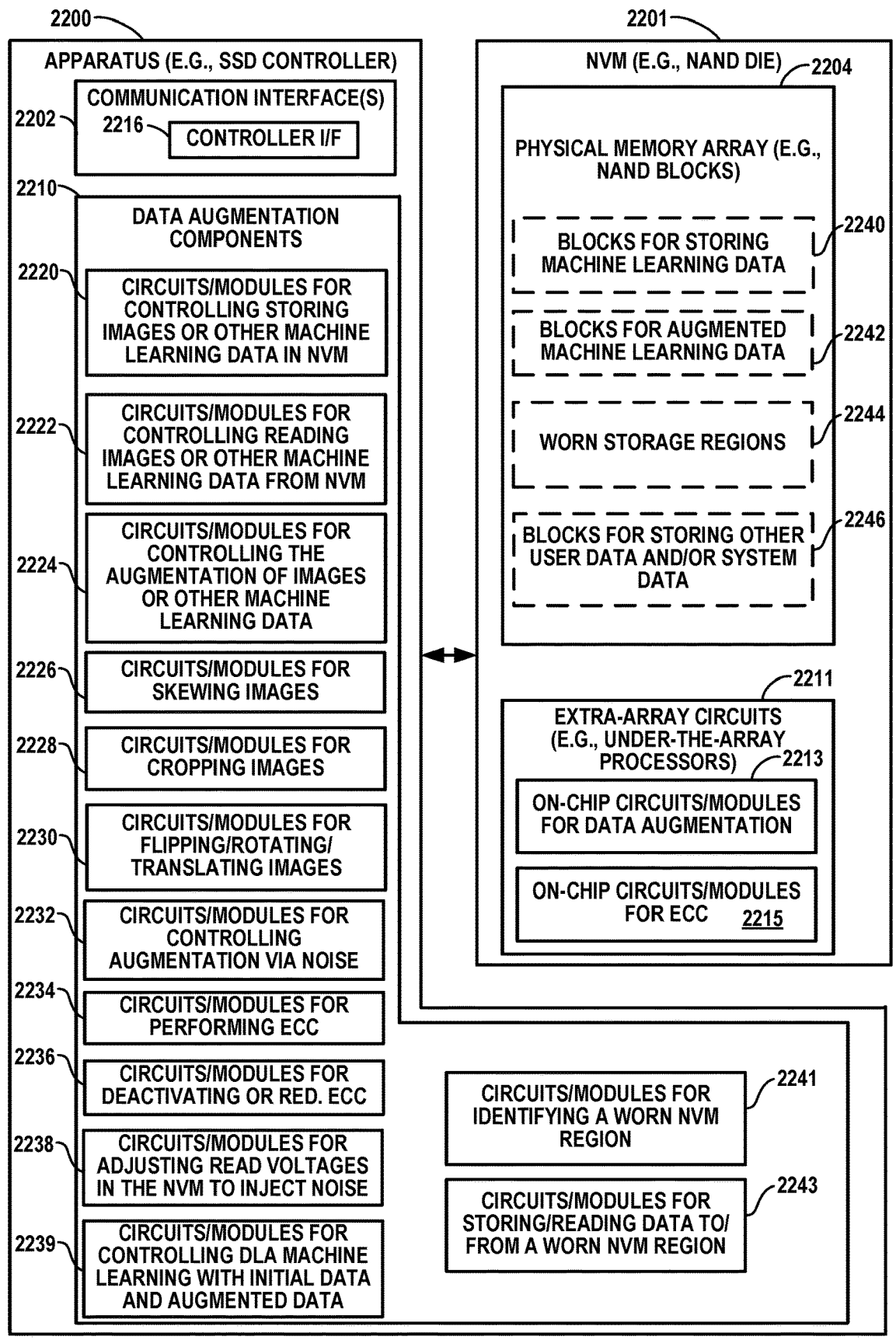
FIG. 22 illustrates a schematic block diagram providing further details of an exemplary apparatus configured to augment machine learning data obtained from an NVM die.

FIG. 22 illustrates an embodiment of an apparatus 2200 configured according to one or more aspects of the disclosure. As with the example of FIG. 14, the apparatus 2200, or components thereof, could embody or be implemented within a data storage controller such as an SSD controller coupled to a NAND die or some other type of NVM device that supports data storage. In various implementations, the apparatus 2200, or components thereof, could be a component of a processor, a controller, a computing device, a personal computer, a portable device, or workstation, a server, a personal digital assistant, a digital camera, a digital phone, an entertainment device, a medical device, a self-driving vehicle control device, or any other electronic device that stores, processes or uses neural data.

The apparatus 2200 includes a communication interface 2202 and is coupled to a NVM 2201 (e.g. a NAND die). The NVM 2201 includes physical memory array (e.g., NAND blocks) 2204 and extra-array processing circuits 2211 (e.g. under-the-array or next-to-the-array circuits). These components can be coupled to and/or placed in electrical communication with one another via suitable components, represented generally by the connection line in FIG. 22. Although not shown, other circuits such as timing sources, peripherals, voltage regulators, and power management circuits may be provided, which will not be described any further.

The communication interface 2202 provides a means for communicating with other apparatuses over a transmission medium. In some implementations, the communication interface 2202 includes circuitry and/or programming (e.g., a program) adapted to facilitate the communication of information bi-directionally with respect to one or more devices in a system. In some implementations, the communication interface 2202 may be configured for wire-based communication. For example, the communication interface 2202 could be a bus interface, a send/receive interface, or some other type of signal interface including circuitry for outputting and/or obtaining signals (e.g., outputting signal from and/or receiving signals into an SSD).

The physical memory array 2204 may represent one or more NAND blocks. The physical memory array 2204 may be used for storing data such images that are manipulated by the circuits 2211 and/or components of the apparatus 2200. The physical memory array 2204 may be coupled to the circuits 2211 such that the circuits 2211 and/or components of the apparatus 2200 and can read or sense information from, and write or program information to, the physical memory array 2204. That is, the physical memory array 2204 can be coupled to the circuits 2211 and/or components of the apparatus 2200 so that the physical memory array 2204 is accessible by the circuits 2211 and/or components of the apparatus 2200.

The apparatus 2200 includes various date augmentation components 2210 arranged or configured to obtain, process and/or send data, control data access and storage, issue or respond to commands, and control other desired operations. For example, the components 2210 may be implemented as one or more processors, one or more controllers, and/or other structures configured to perform functions. According to one or more aspects of the disclosure, the components 2210 may be adapted to perform any or all of the features, processes, functions, operations and/or routines described herein. For example, the components 2210 may be configured to perform any of the steps, functions, and/or processes described with respect to FIGS. 14-21. As used herein, the term "adapted" in relation to components 2210 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with FIGS. 14-21. The components 2210 serve as an example of a means for processing. In various implementations, the components 2210 may provide and/or incorporate, at least in part, functionality described above for the components 1610 of FIG. 16.

According to at least one example of the apparatus 2200, the data augment components 2210 may include one or more of: circuit/modules 2220 configured for storing images or other machine learning data in the NVM; circuits/modules 2222 configured for reading images or other machine learning data from the NVM; circuits/modules 2224 configured for controlling the augmentation of images or other machine learning data; circuits/modules 2226 configured for skewing images; circuits/modules 2228 configured for cropping images; circuits/modules 2230 configured for flipping/rotating/translating images; circuits/modules 2232 configured for controlling augmentation via noise; circuits/modules 2234 configured for performing ECC; circuits/modules 2236 configured for deactivating or reducing ECC; circuits/modules 2238 configured for adjusting read voltages of the NVM to inject noise; circuits/modules 2239 configured for controlling machine learning with initial data and augmented data such as controlling a DLA; circuits/modules 2241 configured for identifying a worn NVM region; and circuits/modules 2243 configured for storing data to and/or reading data from a worn NVM region storage/read component.

The physical memory array 2204 may include one or more of: blocks 2240 for storing machine learning data; blocks 2242 for storing augmented versions of the machine learning data received from the data augmentation components 2210; blocks 2244 that are worn regions or worn portions; and blocks 2246 for storing other user data or system data (e.g. data pertaining to the overall control of operations of the NAND die). In some examples, the extra-array circuits 2211 of NVM 2201 may include circuits/modules 2213 configured for on-chip data augmentation, e.g. circuits/modules for performing or facilitating data augmentation, and/or circuits/modules 2215 configured for ECC. In other examples, the NVM 2201 is an otherwise conventional NVM with no data augmentation components and/or with no on-chip ECC.

In at least some examples, means may be provided for performing the functions illustrated in FIG. 22 and/or other functions illustrated or described herein. For example, the means may include one or more of: means, such as circuit/module 2220, for storing images or other machine learning data in the NVM; means, such as circuits/modules 2222, for reading images or other machine learning data from the NVM; means, such as circuits/modules 2224, for controlling the augmentation of images or other machine learning data; means, such as circuits/modules 2226, for skewing images; means, such as circuits/modules 2228, for cropping images; means, such as circuits/modules 2230, for flipping/rotating/translating images; means, such as circuits/modules 2232, for controlling augmentation via noise; means, such as circuits/modules 2233, for performing ECC; means, such as circuits/modules 2234, for performing ECC; means, such as circuits/modules 2236, for deactivating or reducing ECC; means, such as circuits/modules 2238, for adjusting read voltages to inject noise; means, such as circuits/modules 2239, for controlling machine learning with initial data and augmented data; means, such as circuits/modules 2241 or other worn NVM region identifier components, for identifying a worn NVM region; means, such as circuits/modules 2243 or other worn NVM region storage components, for storing data to and/or reading data from a worn NVM region; means, such as NAND blocks 2240, for storing machine learning data; means, such as NAND blocks 2242, for storing augmented versions of the machine learning data; and means, such as NAND blocks 2246, for storing other user data or system data (e.g. data pertaining to the overall control of operations of the NAND die).

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NAND flash memory, such as 3D NAND flash memory. Semiconductor memory devices include volatile memory devices, such as DRAM or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:
    a memory die with non-volatile memory (NVM) elements; and
    a non-transitory storage controller that is separate from the memory die, the storage controller configured to:
        obtain machine learning training images from the NVM elements of the memory die, and
        augment the machine learning training images by (a) generating altered machine learning training images using an image augmentation component of the storage controller and (b) controlling the memory die to generate other altered machine learning training images for retrieval by the storage controller;
    wherein the memory die includes read components configured to apply read voltages to the NVM elements to read data from the NVM elements, and
    wherein the storage controller is further configured to control the memory die to generate the other altered machine learning training images by:
        controlling the memory die to modify the read voltages to retain a greater amount of read errors as compared to an amount of read errors that would otherwise occur when reading training image data not subject to augmentation; and
        controlling the memory die to apply the modified read voltages to the NVM elements while reading stored training image data from the NVM elements.

2. The data storage device of claim 1, wherein the storage controller is further configured to generate the altered machine learning training images using the image augmentation component of the storage controller by applying one or more of rotation, translation, skew, cropping, flipping, and noise addition to one or more initial images obtained from the NVM elements.

3. The data storage device of claim 1,
    wherein the storage controller comprises error correction components configured to correct errors in data read from the NVM elements of the memory die, and
    wherein the storage controller is further configured to generate the altered machine learning training images by controlling the error correction components to increase an amount of noise in training image data read from the NVM elements.

4. The data storage device of claim 3, wherein the storage controller is further configured to generate the altered machine learning training images by reducing an amount of error correction performed by the error correction components compared to an amount of error correction that would otherwise be employed to read training image data not subject to augmentation.

5. The data storage device of claim 1, wherein the storage controller further comprises:
    a worn NVM region identifier component configured to identify worn regions of the NVM elements of the memory die that are subject to storage errors; and
    a worn region storage component configured to control the memory die to store versions of training image data in the worn regions of the NVM elements of the memory die and then read the versions of the training image data from the worn regions of the NVM elements to obtain noise-augmented versions of the training image data.

6. The data storage device of claim 1, wherein the NVM elements of the memory die comprise NAND storage elements.

7. The data storage device of claim 1, further comprising a plurality of the memory dies and wherein the storage controller is further configured to:
    obtain the machine learning training images from the NVM elements of the plurality of the memory dies in parallel; and
    augment the machine learning training images obtained from the plurality of the memory dies.

8. The data storage device of claim 7, wherein the storage controller is further configured to control the plurality of memory dies to adjust one or more of error correction within the memory dies, read voltages within the memory dies, and the storage of un-augmented versions of training image data in worn regions of the NVM elements of the memory dies.

9. A method for use by a non-transitory storage controller of a data storage device, wherein the data storage device includes a memory die with non-volatile memory (NVM) elements and wherein the storage controller is separate from the memory die, the method comprising:
 obtaining machine learning training images from the NVM elements of the memory die; and
 augmenting the machine learning training images by (a) generating altered machine learning training images using an image augmentation component of the storage controller and (b) controlling the memory die to generate other altered machine learning training images for retrieval by the storage controller;
 wherein augmenting the machine learning training images using the storage controller further comprises:
  controlling the memory die to modify the read voltages to retain a greater amount of read errors as compared to an amount of read errors that would otherwise occur when reading training image data not subject to augmentation; and
  controlling the memory die to apply the modified read voltages to the NVM elements while reading at least some machine learning training images from the NVM elements.

10. The method of claim 9, further comprising performing at least one machine learning operation with the altered machine learning training images using the storage controller.

11. The method of claim 10, wherein performing the at least one machine learning operation using the storage controller further comprises training a deep learning accelerator (DLA) using the altered machine learning training images.

12. The method of claim 9, wherein the machine learning training images comprise labeled training images and the altered machine learning training images comprise altered labeled training images.

13. The method of claim 12, wherein augmenting the machine learning training images using the storage controller further comprises:
 reading one or more of the labeled training images from the NVM elements; and
 performing one or more of rotating, translating, skewing, cropping, flipping, and adding noise to the one or more labeled training images to generate the one or more altered machine learning training images.

14. The method of claim 9, wherein augmenting the machine learning training images using the storage controller further comprises:
 reducing the use of error correction components that are configured to apply error correction to data read from the NVM elements; and
 reading machine learning training image data from the NVM elements with reduced error correction.

15. The method of claim 9, wherein augmenting the machine learning training images using the storage controller further comprises:
 identifying portions of the memory die subject to storage errors;
 controlling the memory die to store the at least some machine learning training images in the portions of the memory die subject to storage errors; and
 reading the machine learning training images from the portions of the memory die subject to storage errors to obtain noise-augmented versions of the machine learning training images.

16. The method of claim 9, wherein the data storage device comprises a plurality of the memory dies and wherein the method further comprises:
 obtaining the machine learning training images from the NVM elements of the plurality of the memory dies in parallel; and
 augmenting the machine learning training images obtained from the plurality of the memory dies in parallel.

17. An apparatus of a data storage device, the apparatus comprising:
 means within a non-transitory storage controller of the data storage device for obtaining machine learning training images from a non-volatile memory (NVM) array of a memory die of the data storage device, wherein the storage controller is separate from the memory die; and
 means within the storage controller of the data storage device for augmenting the machine learning training images by (a) generating altered machine learning training images and (b) controlling the memory die to generate other altered machine learning training images for retrieval by the means for obtaining;
 wherein the means for augmenting the machine learning training images comprises:
  means for controlling the memory die to modify the read voltages to retain a greater amount of read errors as compared to an amount of read errors that would otherwise occur when reading training image data not subject to augmentation; and
  means for controlling the memory die to apply the modified read voltages to the NVM elements while reading at least some machine learning training images from the NVM elements.

18. The data storage device of claim 1, wherein the storage controller further comprises a machine learning controller configured to train a deep learning accelerator (DLA) using the altered machine learning training images.

* * * * *